United States Patent
Chen et al.

(10) Patent No.: US 10,567,800 B2
(45) Date of Patent: Feb. 18, 2020

(54) TRANSFORM HARDWARE ARCHITECTURE FOR VIDEO CODING

(71) Applicant: QUALCOMM Incorporated, San Diego, CA (US)

(72) Inventors: Yunqing Chen, Campbell, CA (US); Srikanth Alaparthi, San Diego, CA (US); Tushar Singhal, San Diego, CA (US); Harikrishna Reddy, San Jose, CA (US); Ashish Mishra, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 157 days.

(21) Appl. No.: 15/451,944

(22) Filed: Mar. 7, 2017

(65) Prior Publication Data

US 2018/0152732 A1    May 31, 2018

(30) Foreign Application Priority Data

Nov. 29, 2016  (IN) ............................. 201641040682

(51) Int. Cl.
*H04N 19/61* (2014.01)
*H04N 19/423* (2014.01)

(52) U.S. Cl.
CPC ........... *H04N 19/61* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 5,668,748 A * | 9/1997 | Huang | G06F 17/147 382/248 |
| 5,684,534 A * | 11/1997 | Harney | H04N 19/51 375/240.03 |
| 5,821,885 A | 10/1998 | Wise et al. | |
| 6,876,704 B2 * | 4/2005 | LaRocca | G06F 17/147 375/240.2 |
| 7,242,713 B2 | 7/2007 | Srinivasan et al. | |

(Continued)

OTHER PUBLICATIONS

Xanthopoulos T., "Low Power Data-Dependent Transform Video and Still Image Coding", Doctor of Philosophy in Electrical Engineering and Computer Science at the Massachusetts Institute of Technology, Feb. 1999, pp. 1-175.

(Continued)

*Primary Examiner* — Lindsay J Uhl
(74) *Attorney, Agent, or Firm* — Shumaker & Sieffert, P.A.

(57) ABSTRACT

Techniques are described for performing transformation on video data. A transform circuit may receive M sample values of the video data from a pre-transform buffer, and process the M sample values with N computation units of the transform circuit to generate intermediate values. Processing the M sample values to generate the intermediate values includes feeding back temporary values from output of one or more of the N computation units to input of one or more of the N computation units. The transform circuit may store a first set of the intermediate values in a transpose buffer, and store a second set of the intermediate values in the pre-transform buffer that are to be later retrieved for storage in the transpose buffer.

25 Claims, 14 Drawing Sheets

(56) References Cited

U.S. PATENT DOCUMENTS

| | | | | |
|---|---|---|---|---|
| 7,439,883 B1* | 10/2008 | Moni | ............... | H04N 19/61 341/60 |
| 9,131,210 B2 | 9/2015 | Sezer | | |
| 9,432,696 B2 | 8/2016 | Chong et al. | | |
| 2009/0080515 A1* | 3/2009 | Nagaraj | ............ | H04N 19/61 375/240.2 |
| 2013/0034150 A1* | 2/2013 | Sadafale | ............ | H04N 19/129 375/240.03 |

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.261, Line Transmission of Non-Telephone Signals, Video Codec for Audiovisual Services At p × 64 kbits, The International Telecommunication Union, Mar. 1993, 32 pp.

ITU-T H.262, Information Technology Generic Coding of Moving Pictures and Associated Audio Information: Video, The International Telecommunication Union, Jul. 1995, 211 pp.

Wang Y., et al., "High Efficiency Video Coding (HEVC) Defect Report" Joint Collaborative Team on Video Coding (JCT-VC) of ITU-T SG16 WP3 and ISO/IEC JTC1/SC29/WG11 14th Meeting: Vienna, AT Jul. 25-Aug. 2, 2013, JCTVC-N1003_v1, Sep. 27, 2013, 312 pp.

Boyce J., et al., "Draft high efficiency video coding (HEVC) version 2, combined format range extensions (RExt), scalability (SHVC), and multi-view (MV-HEVC) extensions", Joint Collaborative Team on Video Coding (JCT-VC) of ITU-T SG16 WP3 and ISO/IEC JTC1/SC29/WG11 18th Meeting: Sapporo, JP, Jun. 30-Jul. 9, 2014, JCTVC-R1013_v6, Oct. 1, 2014, 545 pp.

Sharabayko M., et al., "Intra Compression Efficiency in VP9 and HEVC", Applied Mathematical Sciences, vol. 7, 2013, No. 137, pp. 6803-3824. (Applicant points out, in accordance with MPEP 609.04(a), that the year of publication, 2013, is sufficiently earlier than the effective U.S. filing date, so that the particular month of publication is not in issue.)

* cited by examiner

| H/W Stage | I0 | I1 | I2 | I3 | I4 | I5 | C0 | C1 | C2 | C3 |
|---|---|---|---|---|---|---|---|---|---|---|
| 1 | inp[1] | inp[31] | inp[17] | inp[15] | x | x | 31_64 | -1_64 | 15_64 | -17_64 |
|  | inp[1] | inp[31] | inp[17] | inp[15] | x | x | 1_64 | 31_64 | 17_64 | 15_64 |
|  | inp[5] | inp[27] | inp[21] | inp[11] | x | x | 27_64 | -5_64 | 11_64 | -21_64 |
|  | inp[5] | inp[27] | inp[21] | inp[11] | x | x | 5_64 | 27_64 | 21_64 | 11_64 |
|  | inp[25] | inp[7] | inp[9] | inp[23] | x | x | 7_64 | -25_64 | 23_64 | -9_64 |
|  | inp[25] | inp[7] | inp[9] | inp[23] | x | x | 25_64 | 7_64 | 9_64 | 23_64 |
|  | inp[29] | inp[3] | inp[13] | inp[19] | x | x | 3_64 | -29_64 | 19_64 | -13_64 |
|  | inp[29] | inp[3] | inp[13] | inp[19] | x | x | 29_64 | 3_64 | 13_64 | 19_64 |
| 2 | inp[0] | inp[16] | inp[8] | inp[24] | step2[16] | step2[17] | 16_64 | -16_64 | 24_64 | -8_64 |
|  | inp[0] | inp[16] | inp[8] | inp[24] | step2[18] | step2[19] | 16_64 | 16_64 | 8_64 | 24_64 |
|  | inp[4] | inp[28] | inp[20] | inp[12] | step2[20] | step2[21] | 28_64 | -4_64 | 12_64 | -20_64 |
|  | inp[4] | inp[28] | inp[20] | inp[12] | step2[22] | step2[23] | 4_64 | 28_64 | 20_64 | 12_64 |
|  | inp[2] | inp[30] | inp[18] | inp[14] | step2[24] | step2[25] | 30_64 | -2_64 | 14_64 | -18_64 |
|  | inp[2] | inp[30] | inp[18] | inp[14] | step2[26] | step2[27] | 2_64 | 30_64 | 18_64 | 14_64 |
|  | inp[26] | inp[6] | inp[10] | inp[22] | step2[28] | step2[29] | 6_64 | -26_64 | 22_64 | -10_64 |
|  | inp[26] | inp[6] | inp[10] | inp[22] | step2[30] | step2[31] | 26_64 | 6_64 | 10_64 | 22_64 |
| 3 | step1[1] | step1[2] | step2[5] | step2[6] | step1[0] | step2[7] | 1 | 0 | 16_64 | 16_64 |
|  | step1[1] | step1[2] | step2[5] | step2[6] | step1[3] | step2[4] | 0 | 1 | -16_64 | 16_64 |
|  | step1[9] | step1[14] | step1[10] | step1[13] | step1[8] | step1[11] | -8_64 | 24_64 | -24_64 | -8_64 |
|  | step1[9] | step1[14] | step1[10] | step1[13] | step1[15] | step1[12] | 24_64 | 8_64 | -8_64 | 24_64 |
|  | step2[17] | step2[30] | step2[18] | step2[29] | step2[16] | step2[19] | -4_64 | 28_64 | -28_64 | -4_64 |
|  | step2[17] | step2[30] | step2[18] | step2[29] | step2[23] | step2[20] | 28_64 | 4_64 | -4_64 | 28_64 |
|  | step2[22] | step2[25] | step2[21] | step2[26] | step2[24] | step2[27] | -12_64 | -20_64 | -20_64 | 12_64 |
|  | step2[22] | step2[25] | step2[21] | step2[26] | step2[31] | step2[28] | -20_64 | 12_64 | 12_64 | 20_64 |
| 4 | step2[2] | step2[5] | step1[10] | step1[13] | step2[0] | step1[15] |  | 0 | 16_64 | 16_64 |
|  | step2[2] | step2[5] | step1[10] | step1[13] | step2[1] | step1[14] | 0 | 1 | -16_64 | 16_64 |
|  | step2[3] | step2[4] | step1[11] | step1[12] | step2[6] | step1[9] | 1 | 0 | 16_64 | 16_64 |
|  | step2[3] | step2[4] | step1[11] | step1[12] | step2[7] | step1[8] | 0 | 1 | -16_64 | 16_64 |
|  | step2[18] | step2[29] | step2[21] | step2[26] | step2[16] | step2[23] | -8_64 | 24_64 | -24_64 | -8_64 |
|  | step2[18] | step2[29] | step2[21] | step2[26] | step2[17] | step2[22] | 24_64 | 8_64 | -8_64 | 24_64 |
|  | step2[19] | step2[28] | step2[20] | step2[27] | step2[31] | step2[24] | -8_64 | 24_64 | -24_64 | -8_64 |
|  | step2[19] | step2[28] | step2[20] | step2[27] | step2[30] | step2[25] | 24_64 | 8_64 | -8_64 | 24_64 |
| 5 | step1[4] | step1[11] | step2[20] | step2[27] | step1[0] | step2[31] | 1 | 0 | 16_64 | 16_64 |
|  | step1[4] | step1[11] | step2[20] | step2[27] | step1[1] | step2[30] | 0 | 1 | -16_64 | 16_64 |
|  | step1[5] | step1[10] | step2[21] | step2[26] | step1[2] | step2[29] | 1 | 0 | 16_64 | 16_64 |
|  | step1[5] | step1[10] | step2[21] | step2[26] | step1[3] | step2[28] | 0 | 1 | -16_64 | 16_64 |
|  | step1[6] | step1[9] | step2[22] | step2[25] | step1[12] | step2[19] | 1 | 0 | 16_64 | 16_64 |
|  | step1[6] | step1[9] | step2[22] | step2[25] | step1[13] | step2[18] | 0 | 1 | -16_64 | 16_64 |
|  | step1[7] | step1[8] | step2[23] | step2[24] | step1[14] | step2[17] | 1 | 0 | 16_64 | 16_64 |
|  | step1[7] | step1[8] | step2[23] | step2[24] | step1[15] | step2[16] | 0 | 1 | -16_64 | 16_64 |

FIG. 9A

| O0 | C-code stage no-line no | O1 | C-code stage no-line no | O2 | C-code stage no-line no | O3 | C-code stage no-line no |
|---|---|---|---|---|---|---|---|
| step1[16] | 1-17 | step1[17] | 1-18 | x | | x | |
| step1[31] | | step1[30] | | x | | x | |
| step1[20] | 1-21 | step1[21] | 1-22 | x | | x | |
| step1[27] | | step1[26] | | x | | x | |
| step1[19] | 1-20 | step1[18] | 1-19 | x | | x | |
| step1[28] | | step1[29] | | x | | x | |
| step1[23] | 1-24 | step1[22] | 1-23 | x | | x | |
| step1[24] | | step1[25] | | x | | x | |
| step2[1] | 4-1, 3-1, 3-2, 2-2, 1,2-2, 1-1, 1-2 | step2[2] | 4-2, 3-3, 3-4, 2-3, 2-4, 1-3, 1-4 | step2[16] | Keeping same values, no addition or subtraction | step2[17] | Keeping same values, no addition or subtraction |
| step2[0] | | step2[3] | | step2[18] | | step2[19] | |
| step1[4] | 3-5, 2-5, 2-8, 1-5, 1-8 | step1[5] | 3-6, 2-6, 2-7, 1-6, 1-7 | step2[20] | | step2[21] | |
| step1[7] | | step1[6] | | step2[22] | | step2[23] | |
| step2[8] | 2-9, 1-9, 1-16 | step2[9] | 2-10, 1-10, 1-15 | step2[24] | | step2[25] | |
| step2[15] | | step2[14] | | step2[26] | | step2[27] | |
| step2[11] | 2-12, 1-12, 1-13 | step2[10] | 2-11, 1-11, 1-14 | step2[28] | | step2[29] | |
| step2[12] | | step2[13] | | step2[30] | | step2[31] | |
| step1[1] | same as i/p | step1[6] | 5-6 | step2[0] | 6-1, 5-7 | step2[7] | 6-8, 5-7 |
| step1[2] | | step1[5] | | step2[3] | 6-4, 5-4 | step2[4] | 6-5, 5-4 |
| step2[9] | 4-9 | step2[10] | 4-10 | step1[8] | 5-8, 4-7, 4-11 | step1[11] | 5-11, 4-7, 4-11 |
| step2[14] | | step2[13] | | step1[15] | 5-15, 4-8, 4-12 | step1[12] | 5-12, 4-8, 4-12 |
| step1[17] | 3-17 | step1[18] | 3-18 | step2[16] | 4-13, 3-15, 3-19 | step2[19] | 4-16, 3-15, 3-19 |
| step1[30] | | step1[29] | | step2[23] | 4-20, 3-20, 3-23 | step2[20] | 4-17, 3-20, 3-23 |
| step1[22] | 3-22 | step1[21] | 3-21 | step2[24] | 4-21, 3-24, 3-25 | step2[27] | 4-24, 3-24, 3-25 |
| step1[25] | | step1[26] | | step2[31] | 4-28, 3-16, 3-26 | step2[28] | 4-25, 3-16, 3-26 |
| step2[2] | same as i/p | step2[13] | 6-11 | step1[0] | 7-1, 6-14 | step1[15] | 7-16, 6-14 |
| step2[5] | | step2[10] | | step1[1] | 7-2, 6-13 | step1[14] | 7-15, 6-13 |
| step2[3] | | step2[12] | 6-12 | step1[6] | 7-7, 6-10 | step1[9] | 7-10, 6-10 |
| step2[4] | | step2[11] | | step1[7] | 7-8, 6-9 | step1[8] | 7-9, 6-9 |
| step1[18] | 5-18 | step1[21] | 5-21 | step2[16] | 8-15, 5-16, 5-23 | step2[23] | 8-22, 5-16, 5-23 |
| step1[29] | | step1[26] | | step2[17] | 8-16, 5-17, 5-22 | step2[22] | 8-21, 5-17, 5-22 |
| step1[19] | 5-19 | step1[20] | 5-20 | step2[31] | 8-30, 5-24, 5-27 | step2[24] | 8-23, 5-24, 5-27 |
| step1[28] | | step1[27] | | step2[30] | 8-29, 5-25, 5-26 | step2[25] | 8-24, 5-25, 5-26 |
| step1[4] | same as i/p | step1[27] | 7-21 | out[0] | 8-1, 7-28 | out[31] | 8-32, 7-28 |
| step1[11] | | step1[20] | | out[1] | 8-2, 7-27 | out[30] | 8-31, 7-27 |
| step1[5] | | step1[26] | 7-22 | out[2] | 8-3, 7-26 | out[29] | 8-30, 7-26 |
| step1[10] | | step1[21] | | out[3] | 8-4, 7-25 | out[28] | 8-29, 7-25 |
| step1[6] | | step1[25] | 7-23 | out[12] | 8-13, 7-20 | out[19] | 8-20, 7-20 |
| step1[9] | | step1[22] | | out[13] | 8-14, 7-19 | out[18] | 8-19, 7-19 |
| step1[7] | | step1[24] | 7-24 | out[14] | 8-15, 7-18 | out[17] | 8-18, 7-18 |
| step1[8] | | step1[23] | | out[15] | 8-16, 7-17 | out[16] | 8-17, 7-17 |

FIG. 9B

| D0 | D1 | O4 | C-code stage no-line no | O5 | C-code stage no-line no |
|---|---|---|---|---|---|
| step1[16] | step1[17] | step2[16] | 2-13 | step2[17] | 2-14 |
| step1[19] | step1[18] | step2[18] | 2-15 | step2[19] | 2-16 |
| step1[20] | step1[21] | step2[20] | 2-17 | step2[21] | 2-18 |
| step1[23] | step1[22] | step2[22] | 2-19 | step2[23] | 2-20 |
| step1[24] | step1[25] | step2[24] | 2-21 | step2[25] | 2-22 |
| step1[27] | step1[26] | step2[26] | 2-23 | step2[27] | 2-24 |
| step1[28] | step1[29] | step2[28] | 2-25 | step2[29] | 2-26 |
| step1[31] | step1[30] | step2[30] | 2-27 | step2[31] | 2-28 |
| step2[0] | step2[3] | step1[0] | 5-1 | step1[3] | 5-4 |
| step2[1] | step2[2] | step1[1] | 5-2 | step1[2] | 5-3 |
| step1[4] | step1[5] | step2[4] | 4-3 | step2[5] | 4-4 |
| step1[7] | step1[6] | step2[6] | 4-5 | step2[7] | 4-6 |
| step2[8] | step2[9] | step1[8] | 3-7 | step1[9] | 3-8 |
| step2[11] | step2[10] | step1[10] | 3-10 | step1[11] | 3-9 |
| step2[12] | step2[13] | step1[12] | 3-11 | step1[13] | 3-12 |
| step2[15] | step2[14] | step1[14] | 3-14 | step1[15] | 3-13 |
| step1[1] | step1[6] | step2[1] | 6-2 | step2[6] | 6-7 |
| step1[2] | step1[5] | step2[2] | 6-3 | step2[5] | 6-6 |
| step2[9] | step2[10] | step1[9] | 5-9 | step1[10] | 5-10 |
| step2[14] | step2[13] | step1[14] | 5-14 | step1[13] | 5-13 |
| step1[17] | step1[18] | step2[17] | 4-14 | step2[18] | 4-15 |
| step1[30] | step1[29] | step2[30] | 4-27 | step2[29] | 4-26 |
| step1[22] | step1[21] | step2[22] | 4-19 | step2[21] | 4-18 |
| step1[25] | step1[26] | step2[25] | 4-22 | step2[26] | 4-23 |
| step2[2] | step2[13] | step1[2] | 7-3 | step1[13] | 7-14 |
| step2[5] | step2[10] | step1[5] | 7-6 | step1[10] | 7-11 |
| step2[3] | step2[12] | step1[3] | 7-4 | step1[12] | 7-13 |
| step2[4] | step2[11] | step1[4] | 7-5 | step1[11] | 7-12 |
| step1[18] | step1[21] | step2[18] | 6-17 | step2[21] | 6-20 |
| step1[29] | step1[26] | step2[29] | 6-28 | step2[26] | 6-25 |
| step1[19] | step1[20] | step2[19] | 6-18 | step2[20] | 6-19 |
| step1[28] | step1[27] | step2[28] | 6-27 | step2[27] | 6-26 |
| step1[4] | step1[27] | out[4] | 8-5 | out[27] | 8-28 |
| step1[11] | step1[20] | out[11] | 8-12 | out[20] | 8-21 |
| step1[5] | step1[26] | out[5] | 8-6 | out[26] | 8-27 |
| step1[10] | step1[21] | out[10] | 8-11 | out[21] | 8-22 |
| step1[6] | step1[25] | out[6] | 8-7 | out[25] | 8-26 |
| step1[9] | step1[22] | out[9] | 8-10 | out[22] | 8-23 |
| step1[7] | step1[24] | out[7] | 8-8 | out[24] | 8-25 |
| step1[8] | step1[23] | out[8] | 8-9 | out[23] | 8-24 |

FIG. 9C

| H/W Stage | i0 | i1 | i2 | i3 | i4 | i5 | C0 | C1 | C2 | C3 |
|---|---|---|---|---|---|---|---|---|---|---|
| 1 | inp[1] | inp[7] | inp[5] | inp[3] | inp[0] | inp[2] | 28_64 | -4_64 | 12_64 | -20_64 |
|   | inp[1] | inp[7] | inp[5] | inp[3] | inp[4] | inp[6] | 4_64 | 28_64 | 20_64 | 12_64 |
| 2 | step1[0] | step1[2] | step1[1] | step1[3] | step2[4] | step2[5] | 16_64 | 16_64 | 8_64 | 24_64 |
|   | step1[0] | step1[2] | step1[1] | step1[3] | step2[7] | step2[6] | 16_64 | -16_64 | 24_64 | -8_64 |
| 3 | step1[1] | step1[2] | step2[5] | step2[6] | step1[0] | step1[7] | 1 | 0 | 16_64 | 16_64 |
|   | step1[1] | step1[2] | step2[5] | step2[6] | step1[3] | step1[4] | 0 | 1 | -16_64 | 16_64 |

FIG. 10A

| O0 | C-code stage no-line no | O1 | C-code stage no-line no | O2 | C-code stage no-line no | O3 | C-code stage no-line no |
|---|---|---|---|---|---|---|---|
| step1[4] step1[7] | 1-5 | step1[5] step1[6] | 1-6 | step1[0] step1[2] | 1-1 1-2 | step1[1] step1[3] | 1-3 1-4 |
| step2[0] step2[1] | 2-1 | step2[3] step2[2] | 2-2 | step1[4] step1[7] | 3-5 3-7 | step2[5] step2[6] | Keeping same values, no add. or sub. |
| step1[1] step1[2] | same as i/p | step1[6] step1[5] | 3-6 | out[0] out[3] | 4-1 4-4 | out[7] out[4] | 4-8 4-5 |

FIG. 10B

| D0 | D1 | O4 | C-code stage no-line no | O5 | C-code stage no-line no |
|---|---|---|---|---|---|
| step1[4] step1[7] | step1[5] step1[6] | step2[4] step2[7] | 2-3 2-6 | step2[5] step2[6] | 2-4 2-5 |
| step2[0] step2[1] | step2[3] step2[2] | step1[0] step1[1] | 3-1 3-2 | step1[3] step1[2] | 3-4 3-3 |
| step1[1] step1[2] | step1[6] step1[5] | out[1] out[2] | 4-2 4-3 | out[6] out[5] | 4-7 4-6 |

FIG. 10C

| H/W Stage | I0 | I1 | I2 | I3 | I4 | I5 | C0 | C1 | C2 | C3 |
|---|---|---|---|---|---|---|---|---|---|---|
| 1 | inp[1] | inp[15] | inp[9] | inp[7] | inp[0] | inp[8] | 30_64 | -2_64 | 14_64 | -18_64 |
|   | inp[1] | inp[15] | inp[9] | inp[7] | inp[4] | inp[12] | 2_64 | 30_64 | 18_64 | 14_64 |
|   | inp[13] | inp[3] | inp[5] | inp[11] | inp[2] | inp[10] | 6_64 | -26_64 | 22_64 | -10_64 |
|   | inp[13] | inp[3] | inp[5] | inp[11] | inp[6] | inp[14] | 26_64 | 6_64 | 10_64 | 22_64 |
| 2 | step2[0] | step2[1] | step2[2] | step2[3] | step1[8] | step1[9] | 16_64 | 16_64 | 8_64 | 24_64 |
|   | step2[0] | step2[1] | step2[2] | step2[3] | step1[15] | step1[14] | 16_64 | -16_64 | 24_64 | -8_64 |
|   | step2[4] | step2[7] | step2[5] | step2[6] | step1[11] | step1[10] | 28_64 | -4_64 | 12_64 | -20_64 |
|   | step2[4] | step2[7] | step2[5] | step2[6] | step1[12] | step1[13] | 4_64 | 28_64 | 20_64 | 12_64 |
| 3 | step1[1] | step1[2] | step2[5] | step2[6] | step1[0] | step2[7] | 1 | 0 | 16_64 | 16_64 |
|   | step1[1] | step1[2] | step2[5] | step2[6] | step1[3] | step2[4] | 0 | 1 | -16_64 | 16_64 |
|   | step1[9] | step1[14] | step1[10] | step1[13] | step2[8] | step2[11] | -8_64 | 24_64 | -24_64 | -8_64 |
|   | step1[9] | step1[14] | step1[10] | step1[13] | step2[15] | step2[12] | 24_64 | 8_64 | -8_64 | 24_64 |
| 4 | step2[2] | step2[5] | step1[10] | step1[13] | step2[0] | step1[15] | 1 | 0 | 16_64 | 16_64 |
|   | step2[2] | step2[5] | step1[10] | step1[13] | step2[1] | step1[14] | 0 | 1 | -16_64 | 16_64 |
|   | step2[3] | step2[4] | step1[11] | step1[12] | step2[6] | step1[9] | 1 | 0 | 16_64 | 16_64 |
|   | step2[3] | step2[4] | step1[11] | step1[12] | step2[7] | step1[8] | 0 | 1 | -16_64 | 16_64 |

FIG. 11A

| O0 | C-code stage no-line no | O1 | C-code stage no-line no | O2 | C-code stage no-line no | O3 | C-code stage no-line no |
|---|---|---|---|---|---|---|---|
| step2[8] | 2-9, 1-9, 1- | step2[9] | 2-10, 1-10, | step2[0] | 2-(1-8), 1-(1-8) Keeping same values, no add. or sub. | step2[1] | 2-(1-8), 1-(1-8) Keeping same values, no add. or sub. |
| step2[15] | 16 | step2[14] | 1-15 | step2[2] | | step2[3] | |
| step2[11] | 2-12, 1-12, | step2[10] | 2-11, 1-11, | step2[4] | | step2[5] | |
| step2[12] | 1-13 | step2[13] | 1-14 | step2[6] | | step2[7] | |
| step2[0] | 4-1, 3-1, 3- | step2[3] | 4-2, 3-3, 3- | step2[8] | 4-(7,8,11,12) Keeping same values, no add. or sub. | step1[9] | Keeping same values, no add. or sub. |
| step2[1] | 2 | step2[2] | 4 | step2[15] | | step1[14] | |
| step1[4] | 3-5 | step1[5] | 3-6 | step2[11] | | step1[10] | |
| step1[7] | | step1[6] | | step2[12] | | step1[13] | |
| step1[1] | same as i/p | step1[6] | 5-6 | step2[0] | 6-1, 5-7 | step2[7] | 6-8, 5-7 |
| step1[2] | | step1[5] | | step2[3] | 6-4, 5-5 | step2[4] | 6-5, 5-5 |
| step2[9] | 4-9 | step2[10] | 4-10 | step1[8] | 5-8 | step1[11] | 5-11 |
| step2[14] | | step2[13] | | step1[15] | 5-15 | step1[12] | 5-12 |
| step2[2] | | step2[13] | 6-11 | out[0] | 7-1, 6-14 | out[15] | 7-16, 6-14 |
| step2[5] | same as i/p | step2[10] | | out[1] | 7-2, 6-13 | out[14] | 7-15, 6-13 |
| step2[3] | | step2[12] | 6-12 | out[6] | 7-7, 6-10 | out[9] | 7-10, 6-10 |
| step2[4] | | step2[11] | | out[7] | 7-8, 6-9 | out[8] | 7-9, 6-9 |

FIG. 11B

| D0 | D1 | O4 | C-code stage no- line no | O5 | C-code stage no- line no |
|---|---|---|---|---|---|
| step2[8] | step2[9] | step1[8] | 3-7 | step1[9] | 3-8 |
| step2[15] | step2[14] | step1[15] | 3-14 | step1[14] | 3-13 |
| step2[11] | step2[10] | step1[11] | 3-10 | step1[10] | 3-9 |
| step2[12] | step2[13] | step1[12] | 3-11 | step1[13] | 3-12 |
| step2[0] | step2[3] | step1[0] | 5-1 | step1[3] | 5-4 |
| step2[1] | step2[2] | step1[1] | 5-2 | step1[2] | 5-3 |
| step1[4] | step1[5] | step2[4] | 4-3 | step2[5] | 4-4 |
| step1[7] | step1[6] | step2[7] | 4-5 | step2[6] | 4-6 |
| step1[1] | step1[6] | step2[1] | 6-2 | step2[6] | 6-7 |
| step1[2] | step1[5] | step2[2] | 6-3 | step2[5] | 6-6 |
| step2[9] | step2[10] | step1[9] | 5-9 | step1[10] | 5-10 |
| step2[14] | step2[13] | step1[14] | 5-14 | step1[13] | 5-13 |
| step2[2] | step2[13] | out[2] | 7-3 | out[13] | 7-14 |
| step2[5] | step2[10] | out[5] | 7-6 | out[10] | 7-11 |
| step2[3] | step2[12] | out[3] | 7-4 | out[12] | 7-13 |
| step2[4] | step2[11] | out[4] | 7-5 | out[11] | 7-12 |

FIG. 11C

| H/W Stage | I0 | I1 | I2 | I3 | I4 | I5 | C0 | C1 | C2 | C3 |
|---|---|---|---|---|---|---|---|---|---|---|
| 1 | inp[0] | inp[2] | inp[1] | inp[3] | x | x | 16_64 | 16_64 | 8_64 | 24_64 |
|   | inp[0] | inp[2] | inp[1] | inp[3] | x | x | 16_64 | -16_64 | 24_64 | -8_64 |

FIG. 12A

| O0 | C-code stage no-line no | O1 | C-code stage no-line no | O2 | C-code stage no-line no | O3 | C-code stage no-line no |
|---|---|---|---|---|---|---|---|
| step[0] | 1-1 | step[3] | 1-2 | x |  | x |  |
| step[1] |  | step[2] |  | x |  | x |  |

FIG. 12B

| D0 | D1 | O4 | C-code stage no-line no | O5 | C-code stage no-line no |
|---|---|---|---|---|---|
| step[0] | step[3] | out[0] | 2-1 | out[3] | 2-4 |
| step[1] | step[2] | out[1] | 2-2 | out[2] | 2-3 |

FIG. 12C

TRANSFORM HARDWARE ARCHITECTURE FOR VIDEO CODING

This application claims the benefit of Indian Provisional Application No. 201641040682, filed Nov. 29, 2016, the content of which is incorporated herein by reference in its entirety.

A computer program listing appendix is included in the application, which is incorporated by reference in its entirety.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, the disclosure describes techniques for performing video data transformation such as transforming residual sample values to coefficient values (e.g., frequency domain sample values), or inverse transforming coefficient values to residual sample values. For purposes of illustration, the examples are described with respect to inverse transforming coefficient values to residual sample values.

In one example, the disclosure describes a method of transforming video data, the method comprising receiving, with a transform circuit, M sample values of the video data from a pre-transform buffer, wherein M represents a non-zero integer value, and wherein the sample values comprise a plurality of frequency domain sample values, processing the M sample values with N computation units of the transform circuit to generate intermediate values, wherein processing the M sample values to generate the intermediate values includes feeding back temporary values from output of one or more of the N computation units to input of one or more of the N computation units, and wherein N represents a non-zero integer value, storing a first set of the intermediate values in a transpose buffer, and storing a second set of the intermediate values in the pre-transform buffer that are to be later retrieved for storage in the transpose buffer.

In one example, the disclosure describes a device for transforming video data, the device comprising a pre-transform buffer, a transpose buffer, and a transform circuit comprising N computation units, the transform circuit configured to receive M sample values of the video data from the pre-transform buffer, wherein M represents a non-zero integer value, and wherein the sample values comprise a plurality of frequency domain sample values, process the M sample values with the N computation units of the transform circuit to generate intermediate values, wherein processing the M sample values to generate the intermediate values includes feeding back temporary values from output of one or more of the N computation units to input of one or more of the N computation units, and wherein N represents a non-zero integer value, and store a first set of the intermediate values in the transpose buffer. The pre-transform buffer is configured to store a second set of the intermediate values that are to be later retrieved for storage in the transpose buffer.

In one example, the disclosure describes a device for transforming video data, the device comprising a pre-transform buffer, a transpose buffer, and a transform circuit comprising N computation units, means for receiving M sample values of the video data from the pre-transform buffer, wherein M represents a non-zero integer value, and wherein the sample values comprise a plurality of frequency domain sample values, means for processing the M sample values with the N computation units of the transform circuit to generate intermediate values, wherein the means for processing the M sample values to generate the intermediate values includes means for feeding back temporary values from output of one or more of the N computation units to input of one or more of the N computation units, and wherein N represents a non-zero integer value, and means for storing a first set of the intermediate values in the transpose buffer. The pre-transform buffer is configured to store a second set of the intermediate values that are to be later retrieved for storage in the transpose buffer.

In one example, the disclosure describes a computer-readable storage medium storing instruction that when executed cause a transform circuitry to receive M sample values of the video data from a pre-transform buffer, wherein M represents a non-zero integer value, and wherein the sample values comprise a plurality of frequency domain sample values, process the M sample values with N computation units of the transform circuitry to generate intermediate values, wherein the instructions that cause the transform circuitry to process the M sample values to generate the intermediate values include instructions that cause the transform circuitry to feed back temporary values from output of one or more of the N computation units to input of one or more of the N computation units, and wherein N represents a non-zero integer value, store a first set of the intermediate values in a transpose buffer, and store a second set of the intermediate values in the pre-transform buffer that are to be later retrieved for storage in the transpose buffer.

The details of one or more examples are set forth in the accompanying drawings and the description below. Other features, objects, and advantages will be apparent from the description, drawings, and claims.

BRIEF DESCRIPTION OF DRAWINGS

FIGS. 9A-9C are tables illustrating example operations for generating 32 intermediate values for 32×32 sized block.

FIGS. 10A-10C are tables illustrating example operations for generating 16 intermediate values for 8×8 sized block.

FIGS. 11A-11C are tables illustrating example operations for generating 8 intermediate values for 16×16 sized block.

FIGS. 12A-12C are tables illustrating example operations for generating 4 intermediate values for 4×4 sized block.

DETAILED DESCRIPTION

Figure 1:
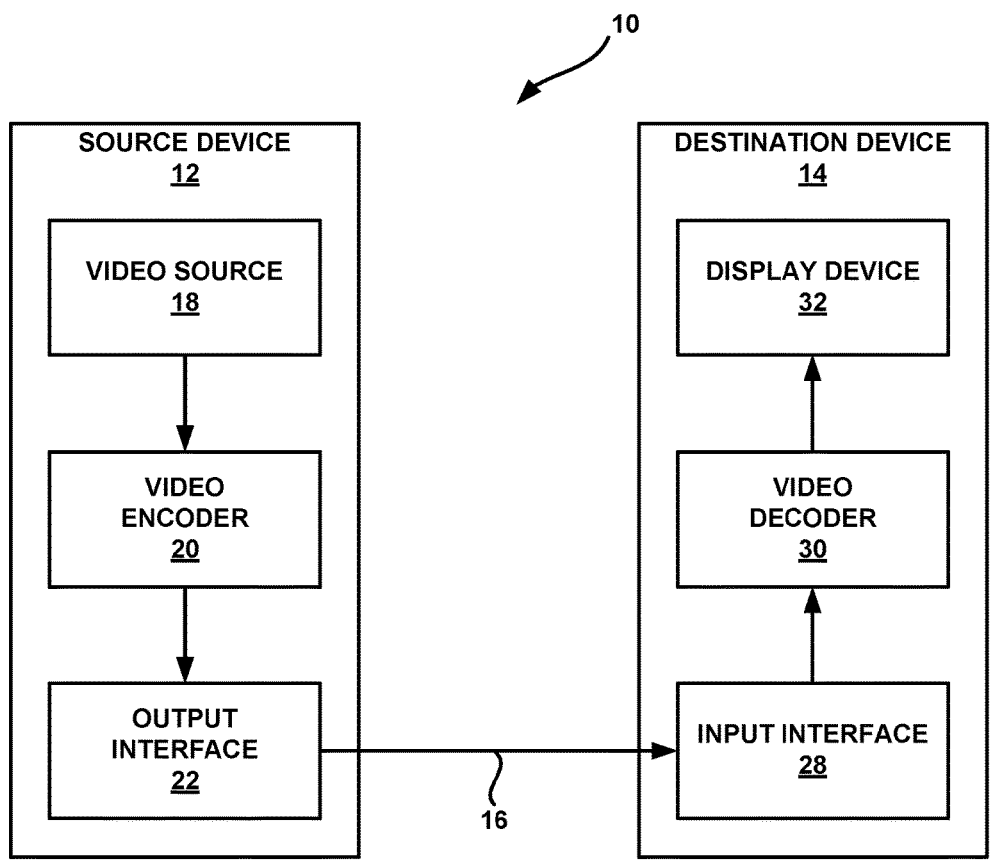
FIG. 1 is a block diagram illustrating an example video coding system that may utilize the techniques described in this disclosure.

Video encoding techniques perform a transform to convert residual sample values (e.g., residual of block being encoded and predictive block) into a frequency domain, and video decoding techniques perform an inverse transform on values in a frequency domain to reconstruct residual sample values. Examples of the transform and inverse transform include discrete cosine transform (DCT) and inverse DCT (IDCT), and discrete sine transform (DST) and inverse DST (IDST), as a few examples, although other examples exist.

Some techniques implement the transform (e.g., DCT or IDCT) for different types of video coding standards by designing a hardware structure that directly implements the equations for the transform, without necessarily optimizing the operations of the equations for hardware. This disclosure describes hardware architecture for performing the transform operations with reduced computations and in a way that efficiently uses the hardware components.

The examples are described with respect to the transform applied during video decoding, but are similarly applicable to video encoding. In this disclosure, for generality, the term "transform" is used to describe the transform that is applied by the video encoder, and used to describe the inverse transform that is applied by the video decoder. Hence, the term "transform" should not be interpreted to limit the example techniques only to video encoding unless specifically mentioned as such.

With respect to the example of a video decoder, a pre-transform buffer stores sample values (e.g., coefficient values or frequency domain values) that are to be transformed (e.g., applying an inverse transform operation) in a block form (e.g., 32×32). Rather than reading out all sample values of a row or column stored in the pre-transform buffer per clock cycle, a flip-flop coupled to the pre-transform buffer is configured to read M sample values from the row or column per clock cycle, where M less than the number of sample values in a row or column. The flip-flop keeps reading M sample values per cycle until values of a row or column are read (e.g., until 32 values from a row or column are read).

The flip-flop outputs the M sample values to a first transform circuit. The first transform circuit includes a plurality of computational units (e.g., N computational units), each computational unit includes adders, multipliers, and other computational components. The plurality of computational units performs respective operations on the M sample values to generate intermediate values. As described below, to generate the intermediate values, the computational units generate temporary values that are fed back to the computational units for further processing, until the computational units generate the intermediate values. The first transform circuit outputs these intermediate values to a second transform circuit, via a transpose buffer. The second transform circuit may have a similar structure as the first transform circuit for generating the final transformed values. In this example, the final transformed values are the residual sample values that are added to a predictive block to reconstruct a current block.

The number of intermediate values that the first transform circuit generates may be equal to the number of sample values in the row or column of the block stored in the pre-transform buffer. For example, if the block is a 32×32 block of sample values, then the first transform circuit may generate 32 values, regardless of the value of M or N.

In some examples, computational efficiency gains may be realized if the computational units are reused during the computation of the intermediate values. For instance, a first feedback path selectively couples outputs of computational units of the first transform circuit (for example) to respective inputs of computational units of the first transform circuit. The first feedback path outputs temporary values generated by the computational units back to the inputs of the computation units, and repeats these operations until the computational units generate the intermediate value. The number of times the temporary values are fed back may be predetermined for each given block size. After the last processing of temporary values to generate the intermediate values, the first feedback path decouples the output of the computational units from the inputs of the computational units, and the computational units store the intermediate values in a transpose buffer. Although explained with respect to the first transform circuit for purposes of example, it should be understood that the computational units of the second transform circuit may be similarly configured.

The transpose buffer may store the intermediate values and output the intermediate values to the second transform circuit for further processing. The second transform circuit may be structurally similar to the first transform unit, and may similarly include a second feedback path to selectively output temporary values from the computational units of the second transform circuit to inputs of the computational units of the second transform circuit until the second transform unit generates the final transform values.

In some examples, the transpose buffer may be configured to store only a subset of the values generated by the first transform circuit. The first transform circuit may store intermediate values back into the pre-transform buffer. After values of a row or column are read from the pre-transform buffer, the memory space storing those values becomes available for storing additional values. By storing some of the intermediate values in this now available memory space of the pre-transform buffer, the transpose buffer may be of a smaller size than a transpose buffer sized to store all of the possible values of the row or column.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that include circuitry for performing a transform of residual data in the pixel domain to coefficient data in the frequency domain, or an inverse transform of coefficient data in the frequency domain to residual data in the pixel domain in accordance with various examples described in this disclosure.

In this disclosure, the term sample values are used generically to refer to values that are transformed (e.g., by video encoder 20) or inverse transformed (e.g., by video decoder 30), and the term transform values or final transform values are used to generically refer to the result of the transform or inverse transform operation. For instance, one example of sample values are residual sample values (e.g., residual between a current block and a predictive block) that video encoder 20 transforms to a plurality of frequency domain sample values. In this example, the frequency domain sample values are an example of the transform values or final transform values. Another example of sample values is frequency domain sample values indicative of residual values that video decoder 30 inverse transforms to a plurality of residual sample values. In this example, the residual sample values are an example of transform values or final transform values.

Accordingly, from the perspective of video encoder 20, residual sample values are an example of sample values, and frequency domain sample values are an example of transform values. From the perspective of video decoder 30, frequency domain sample values are an example of sample values, and residual sample values are an example of transform values. This disclosure generally describes examples with respect to video decoder 30 where frequency domain sample values (also called coefficient values) are the sample values, and the residual sample values are the transform values. However, the techniques may potentially be applicable to video encoder 20 as well, as part of the encoding pass and/or an internal reconstruction pass for generating reference pictures.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In some examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable fixed-function and/or programable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors or processing circuitry such as programmable and/or fixed-function circuitry. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard. Examples video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The HEVC standard is also presented jointly in Recommendation ITU-T H.265 and International Standard ISO/IEC 23008-2, both entitled "High efficiency video coding," and both published October, 2014. There are other examples of video coding standards such as VP9 from Google.

In the various video coding standards, video encoder 20 determines a residual block which is the difference between a current block being encoded and a predictive block. Video encoder 20 transforms this residual block (or a sub-block of this residual block, referred to as a transform block) into a coefficient block, which video encoder 20 may then quantize, entropy encode, and signal. Video decoder 30 entropy decodes and inverse-quantizes to generate the coefficient block. Video decoder 30 inverse-transforms the coefficient block to generate the transform block, which may be the residual block or a sub-block of the residual block, and adds the residual block (e.g., where the residual block is one or more transform blocks) to the predictive block to reconstruct the video block. The coefficient block is also referred to as a frequency domain block because the values in the coefficient block are generated by a frequency transformation, such as DCT, to the frequency domain.

For ease of understanding, the following is described with respect to the HEVC video coding standard to understand one example of the video encoding and video decoding operations. Other video coding standards such as VP9 may perform similar operations, and more particularly, may perform similar operations with respect to the transformation that is applied. In general, HEVC, VP9, and other video coding standards may determine a coefficient block from a residual block via a transform operation as part of the video encoding, and may determine a residual block from coefficient block via an inverse transform operation as part of video decoding. The coefficient block includes a plurality of frequency domain sample values that are coefficients for basis sinusoidal functions (e.g., cosine and sine functions), and the residual block includes a plurality of residual sample values. The example techniques are related to the transform and inverse transform operations.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction, as a few examples, to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Video decoder 30 may similarly determine a predictive block based on a reconstructed corresponding luma block. The corresponding luma block refers to the luma block that was part of the unit (e.g., coding unit or prediction unit) from which the current chroma block was determined. Video encoder 20 may determine the residual between the chroma block and this predictive block generated from a reconstructed corresponding luma block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include an encoded representation of video data. For instance, the bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As described in more detail, in video encoder 20 performing transform on a transform block to generate a transform coefficient block (e.g., frequency domain block), and in video decoder 30 performing an inverse transform on the transform coefficient block (e.g., frequency domain block) to reconstruct the transform block, video encoder 20 and video decoder 30 may include example hardware components, as described in more detail in this disclosure. The transform or inverse transform may be performed in two stages.

For instance, in the first stage, a first transform circuit may read sample values of a block one of row-wise or column-wise, and generate a block of intermediate values. In the second stage, a second transform circuit may read intermediate values from the block of intermediate values in the other of the row-wise or column-wise to generate final transform values. Examples of the sample values include residual sample values for video encoder 20 or frequency domain sample values (also called coefficient sample values) for video decoder 30, and examples of the final transform values include frequency domain sample values for video encoder 20 or residual sample values for video decoder 30.

The operations for performing the transforms or inverse transforms for the VP9 codec may be defined in pseudocode, and an example of the operations for a 32×32, 16×16, 8×8, and 4×4 sized blocks is provided in more detail below. The operations are divided into a plurality of stages (e.g., 8 stages for VP9 for 32×32 sized blocks), and some techniques use circuits to perform each of the stages separately and in a pipeline fashion, or use circuits to perform only one stage at a time, and loop back to sequentially perform the various stages.

For instance, in these techniques, a pre-transform buffer stores samples values of a block that are read row-wise or column-wise by a first transform circuit. The first transform circuit generates intermediate values that are stored in a transpose buffer, and then a second transform circuit reads intermediate values from the transpose buffer in the transpose of the way in which the first transform circuit read sample values from the pre-transform buffer.

However, there may be certain issues with such techniques. As one example, all sample values of an entire row or column may need to be read at one time by the first transform circuit. Accordingly, there may need to be sufficient connection lines from the pre-transform buffer to support reading of all sample values of a row or column, requiring a relatively high read bandwidth. As another example, these techniques utilize a separate transpose buffer, rather than reusing existing buffers, resulting in need for excess memory which utilizes additional space on video encoder 20 and video decoder 30.

This disclosure describes example techniques for reducing the read bandwidth for reading sample values from a pre-transform buffer. For example, rather than reading all sample values of an entire row or column of an A×B sized block, where A and B are non-zero integer values, a first transform circuit may read M sample values of a row or column, where M is a non-zero integer value less than A if sample values are being read row-wise and less than B if sample values are being read column-wise, or less than A and B. In this way, per clock cycle, a first transform circuit may read fewer sample values (e.g., M sample values), resulting in less memory bandwidth, than if the first transform circuit were to read A sample values, if read row-wise, or read B sample values, if read column-wise.

Because fewer than all sample values of one row or column of a block are read, the operations of the first transform circuit are modified as compared to other techniques that read sample values of an entire row or column. The first transform circuit may include a plurality of computation units. In examples described in this disclosure, the first transform circuit may be coupled to a feedback path that feeds back the output from one or more of the computation units of the first transform circuit to one or more inputs of the computation units. For instance, during processing performed by the first transform circuit, the computation units of the first transform circuit may generate temporary values that are fed back as inputs to one or more of the computation units. After the processing, the first transform circuit may generate a plurality of intermediate values.

In this way, although all sample values of a row or column are not being processed at the same time, with feedback, the first transform circuit may repeat computation operations until all sample values of a row or column are processed. The first transform circuit may repeat these operations until all sample values of the A×B block of sample values are processed, and the result of these operations is an A×B sized block of intermediate values.

In some other techniques, a transpose buffer of size of at least A×B would be needed to store the intermediate values. However, in the techniques described in this disclosure, the transpose buffer may be of smaller size than A×B, resulting in the need for less memory space. In examples described in this disclosure, the first transform circuit may store a first set of the intermediate values in the transpose buffer, and the pre-transform buffer may store a second set of the intermediate values. After the first transform reads a sample value from the pre-transform buffer, the storage space dedicated to that sample value is now available to store a different value, and as more sample values are read from the pre-transform buffer, more storage space becomes available in the pre-transform buffer. In this disclosure, the storage space that is now available in the pre-transform buffer (e.g., was used to store sample values that have been read by the first transform circuit) is used to store the second set of intermediate values.

A second transform circuit reads one or more values from the first set of intermediate values (e.g., M intermediate values) from the transpose buffer. The transpose buffer may store one or more values from the second set of intermediate values from the pre-transpose buffer. The second transform circuit may keep reading intermediate values from the transpose buffer, and perform operations similar to those of the first transform circuit. For instance, a feedback path may couple the output of one or more computation units of the second transform circuit to the input of one or more computation units of the second transform circuit. The second transform circuit may perform its operations, and the result may be final transform values. As described above, one example of the final transform values may be frequency domain sample values (also called coefficient sample values) in the example where video encoder 20 is performing the transform, and the sample values stored in the pre-transform buffer are residual sample values. Another example of the final transform values may be residual sample values in the example where video decoder 30 is performing the inverse transform, and the sample values stored in the pre-transform buffer are frequency domain sample values (again, also called coefficient sample values).

Figure 2:
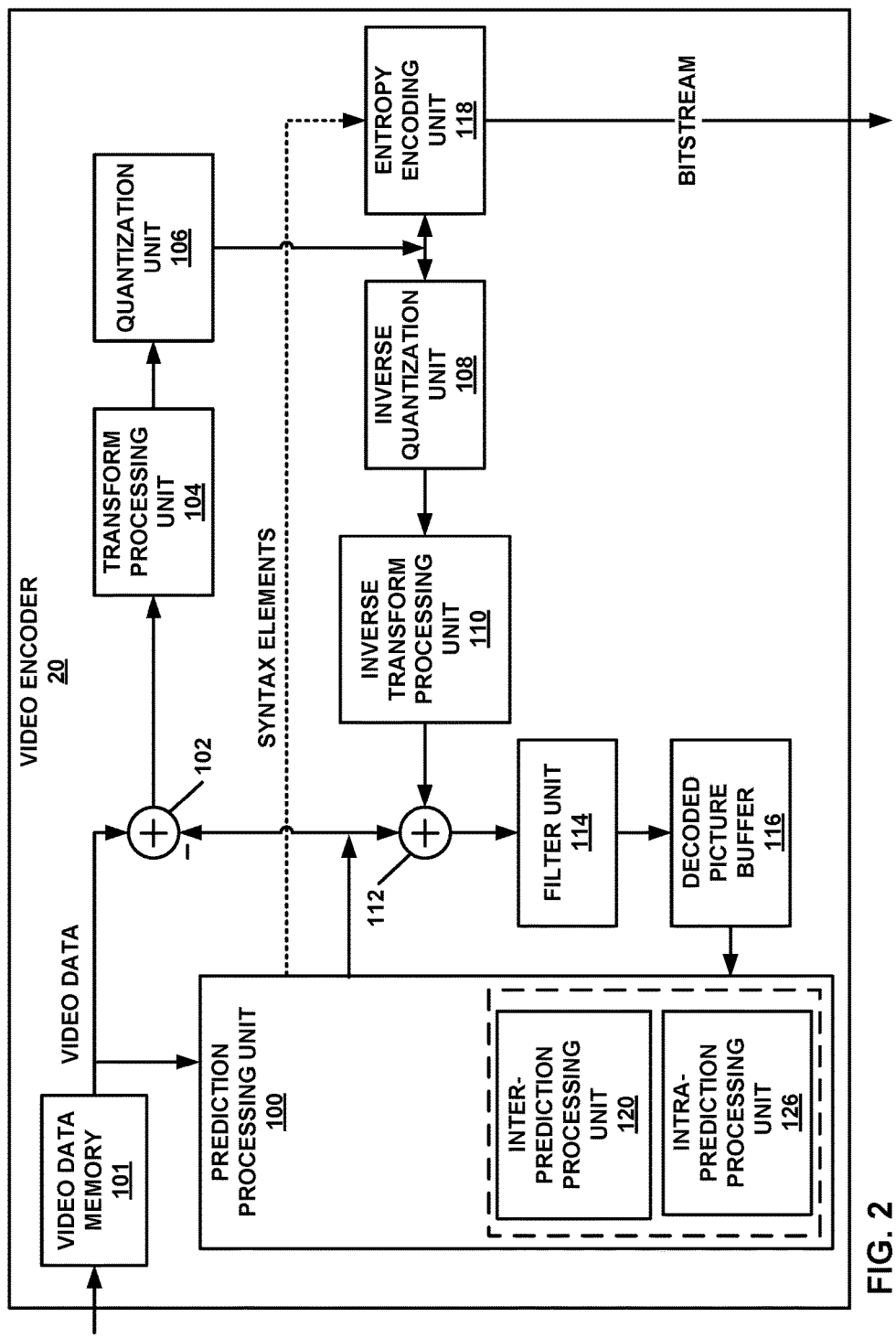
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods including those of VP9.

Processing circuitry includes video encoder 20, and video encoder 20 is configured to perform one or more of the example techniques described in this disclosure. For instance, video encoder 20 includes integrated circuitry, and the various units illustrated in FIG. 2 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 2 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques and/or has software/firmware executing on the hardware to specialize the hardware to perform the example techniques.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20 (e.g., in intra- or inter-coding modes). Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAIVI), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 35 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs, the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block. An example of transform processing unit 104 is illustrated in greater detail with respect with FIG. 4.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. The example illustrated in FIG. 4 may also operate as an example for inverse transform processing unit 110. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 4:
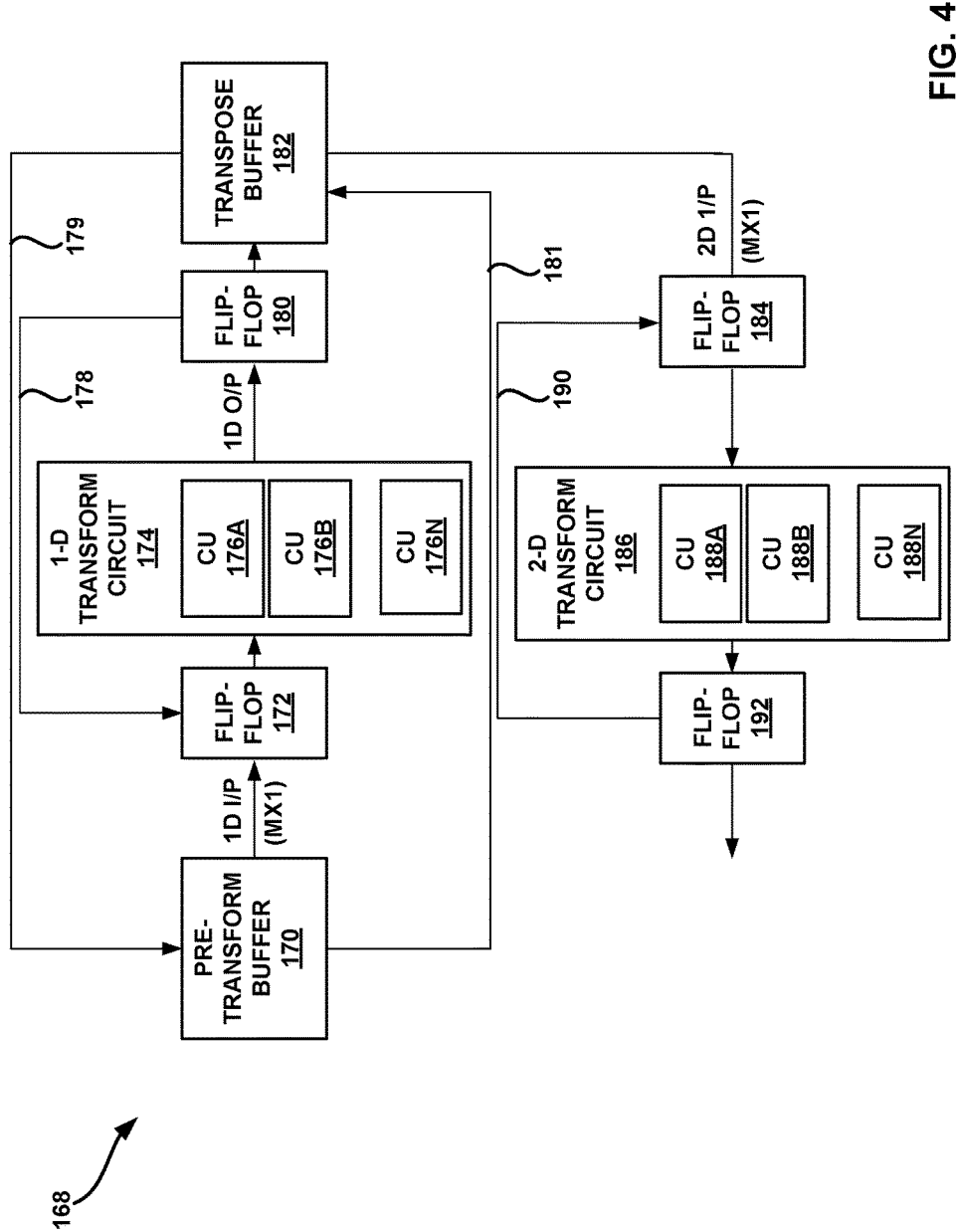
FIG. 4 is a block diagram illustrating an example transform circuitry.

As described in more detail, transform processing unit 104 and inverse transform processing unit 110 may be configured to perform the example techniques described in this disclosure, such as by using transform circuitry 168 described with respect to FIG. 4. For example, transform processing unit 104 may receive a block of residual sample values and process the residual sample values row-wise to generate intermediate values, and then process the intermediate values column-wise (or vice-versa) to generate frequency domain sample values (or coefficient sample values). To generate the frequency domain sample values, circuits within transform processing unit 104 may receive fewer residual sample values than the residual sample values in a row or column, and may include feedback paths to feedback temporary values to perform the example operations. Inverse transform processing unit 110 may perform the inverse operations of transform processing unit 104 (e.g., receive frequency domain sample values and generate residual sample values).

Figure 3:
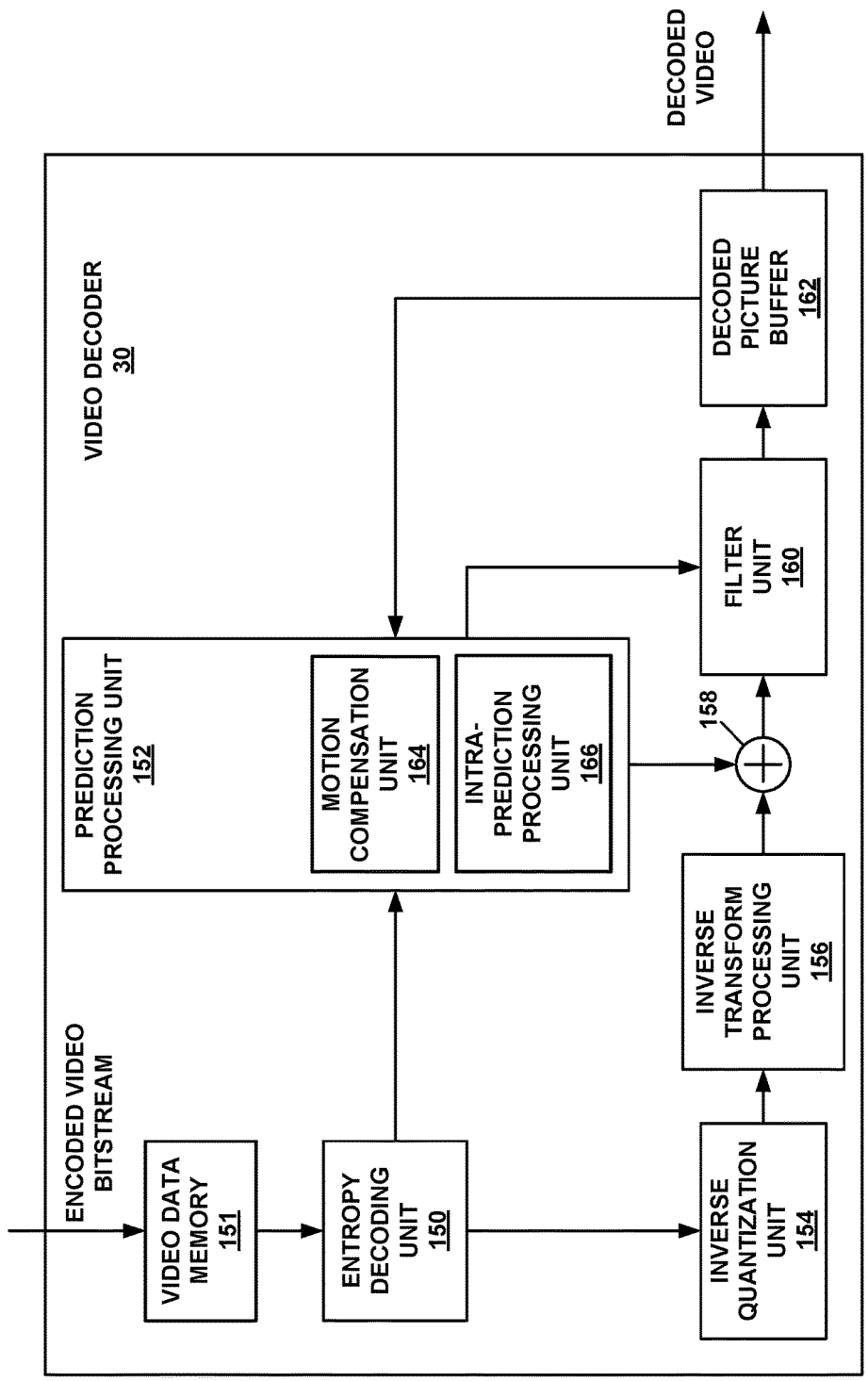
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods including those of VP9.

Processing circuitry includes video decoder 30, and video decoder 30 is configured to perform one or more of the example techniques described in this disclosure. For instance, video decoder 30 includes integrated circuitry, and the various units illustrated in FIG. 3 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 3 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques and/or has software/firmware executing on the hardware to specialize the hardware to perform the example techniques.

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16 (e.g., from a local video source, such as a camera, via wired or wireless network communication of video data, or by accessing physical data storage media). Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units.

Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block. The example illustrated in FIG. 4 may be an example circuit for inverse transform processing unit 156.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

As described in more detail, inverse transform processing unit 156 may be configured to perform the example techniques described in this disclosure, such by using transform circuitry 168 described with respect to FIG. 4. For example, inverse transform processing unit 156 may receive a block of frequency domain sample values (e.g., coefficient sample values) and process the frequency domain sample values row-wise to generate intermediate values, and then process the intermediate values column-wise (or vice-versa) to generate residual sample values. To generate the residual sample values, circuits within inverse transform processing unit 156 may receive fewer frequency domain sample values than the frequency domain sample values in a row or column, and may include feedback paths to feedback temporary values to perform the example operations.

Transform in image and video coding applications may be tasked with high energy compaction. As mobile computing is gaining momentum, performance scalability in high performance devices is increasing and performance/area may become important. In video coding applications for mobile platform, one factor in determining the performance of video encoder 20 and video decoder 30 and the user experience that is delivered, is dependent on the performance of the transformation hardware engine of video encoder 20 and video decoder 30 uses (e.g., the hardwired interconnections and the algorithm used by circuitry of video encoder 20 to perform the transform, and the hardwired interconnections and the algorithm used by circuitry of video decoder 30 to perform the inverse transform).

Many examples of video encoder 20 and video decoder 30 use DCT (discrete cosine transform) kind of transformation, which is a linear transformation. While highly efficient (in terms of decoding), new generation codecs such as VP9 codec from Google uses non-linear transformation. For instance, in HEVC, the DCT transform is a multiplication of two matrices, which is linear. In VP9, there is an additional function applied on the partial multiplication output after multiplying by the first matrix and before multiplying with the second matrix. This additional function is non-linear resulting in the VP9 codec providing a non-linear transformation.

The example of the circuitry (e.g., hardware architecture and circuitry used to perform the operations) used by video encoder 20 (e.g., transform processing unit 104 and inverse transform processing unit 110, as shown in FIG. 2) to perform the transform, and used by video decoder 30 (e.g., inverse transform processing unit 156, as shown in FIG. 3) to perform the inverse transform described in this disclosure may provide performance boost with optimal area which is scalable for various frame per second requirement for VP9 codec. The performance boost is achieved by solving one of the basic bottlenecks encountered by implementation of a hardware processing engine (PE) to match the memory read bandwidth requirement for non-linear transforms.

The rearrangement of various stages of VP9 algorithm to match with the existing hardware may also reduce the actual number of stages and thus, may contribute in achieving high performance. Given the cycle budget per 16×16 or 32×32 block, buffer read requirement and transform scalability may match to provide desirable results when a complete row transformation is to be completed before processing of the next row starts. The examples may be for circuitry and algorithm which may be area efficient and provide a very high degree of scalability.

VP9 codec supports DCT transform of 4×4, 8×8, 16×16, 32×32 and DST (discrete sine transform) transform of 4×4, 8×8, 16×16 with non-linearity added at various stages of transformation. One example design for these transformations replicates C-implementation in hardware (e.g., replicate the software operations written in the C-language in hardware) and that may not scale for lower throughput. Number of computation units include multipliers and adders, memory read bandwidth remains same for even lower throughput and hence, mid-tier and low-tier chips pay area penalty without making use of that high throughput. Considering this issue, this disclosure describes a possible implementation of VP9 decode, at least as subset of that may be applicable to HEVC. The implementation of this disclosure can be easily scaled for a given throughput by altering the memory read bandwidth and number of multipliers. Along with the hardware architecture, this disclosure describes a formula to calculate the performance of the given design.

One technique to perform the transformation or inverse transformation is to hardwire transform processing unit 104, inverse transform processing unit 110, and inverse transform processing unit 156 to perform the exact operations of the software in the order defined by the software. However, forming transform processing unit 104, inverse transform processing unit 110, and inverse transform processing unit 156 in this manner may require transform processing unit 104, inverse transform processing unit 110, and inverse transform processing unit 156 to provide the exact same level of performance across different chip sets that include video encoder 20 or video decoder 30.

For example, a first IC chip that includes video decoder 30 may be for high-end/expensive example of destination device 14, where timely performance is the key measure of the value of destination device 14. A second IC chip that includes video decoder 30 may be for a low-end/less expensive example of destination device 14, where cost is the key measure of the value of destination device 14. In examples where inverse transform processing unit 156 is formed by replicating the software instructions in hardware, inverse transform processing unit 156 may provide the exact same performance for the exact same cost for both the first IC chip and the second IC chip.

In some cases, there may be benefits in having flexibility in the performance of inverse transform processing unit 156. For example, having different memory read bandwidths and memory sizes for inverse transform processing unit 156 across different IC chips that include video decoder 30 may be beneficial. The example techniques described in this disclosure describe ways to form inverse transform processing unit 156 with different performance.

Once formed, the performance of inverse transform processing unit 156 may not change (e.g., the hardwired circuitry of inverse transform processing unit 156 may not change). However, by forming inverse transform processing unit 156 with feedback paths in the transform circuit, and optionally reusing memory in the manner described, inverse transform processing unit 156 may be configured to perform the inverse transform in a way that reduces read bandwidth and memory in examples where such reduction is beneficial, as compared to examples where inverse transform processing unit 156 is hardwired to perform the software instructions as is. Although the above is described with respect to inverse transform processing unit 156, such description is also applicable to transform processing unit 104 and inverse transform processing unit 110.

To illustrate possible issues where the C-language written software operations are replicated in hardware, this disclosure describes a 32×32 DCT VP9 decode transformation. This disclosure also uses an example of 32×32 DCT for explaining example techniques in accordance with this disclosure which may be more scalable than the C-language written software operations, provide fewer computations and fewer circuit area.

VP9 32-coefficients transformation equations for $0^{th}$ output coefficient is described below:

$$\begin{aligned}
\text{Coeff0} = &F((C[0]+C[16])*\text{cospi}\_16\_64)+F(C[8] \\
&*\text{cospi}\_08\_64+C[24]*\text{cospi}\_24\_64)+F(C[20] \\
&*\text{cospi}\_20\_64+C[12]*\text{cospi}\_12\_64)+F(C[4] \\
&*\text{cospi}\_04\_64+C[28]*\text{cospi}\_28\_64)+F(C[26] \\
&*\text{cospi}\_26\_64+C[6]*\text{cospi}\_06\_64)+F(C[10] \\
&*\text{cospi}\_10\_64+C[22]*\text{cospi}\_22\_64)+F(C[18] \\
&*\text{cospi}\_18\_64+C[14]*\text{cospi}\_14\_64)+F(C[2] \\
&*\text{cospi}\_02\_64+C[30]*\text{cospi}\_30\_64)+F(C[29] \\
&*\text{cospi}\_29\_64+C[3]*\text{cospi}\_03\_64)+F(C[13] \\
&*\text{cospi}\_13\_64+C[19]*\text{cospi}\_19\_64)+F(C[21] \\
&*\text{cospi}\_21\_64+C[11]*\text{cospi}\_11\_64)+F(C[5] \\
&*\text{cospi}\_05\_64+C[27]*\text{cospi}\_27\_64)+F(C[25] \\
&*\text{cospi}\_25\_64+C[7]*\text{cospi}\_07\_64)+F(C[9] \\
&*\text{cospi}\_09\_64+C[23]*\text{cospi}\_23\_64)+F(C[17] \\
&*\text{cospi}\_17\_64+C[15]*\text{cospi}\_15\_64)+F(C[1] \\
&*\text{cospi}\_01\_64+C[31]*\text{cospi}\_31\_64)
\end{aligned}$$

Where, C[i]=input coefficients $\forall i \in [0\ 31]$
cospi_j_64=multiplying constant numbers $\forall j \in [0\ 31]$
F(x)=non-linear function of x The above equation is different for other coefficients of a row/column. The C implementation of VP9 decode transformation is provided, at the end of this disclosure, which performs this complete transformation in 8 stages for 32×32 sized blocks. At $8^{th}$ stage, this implementation produces all 32 intermediate values of a row/column together.

In some techniques, where the above issues may be present, a buffer, which can store one 32×32 coefficients to be transformed, stores 32×32 coefficients. A row of 32 coefficients from the buffer is then fed to 1-D transform circuitry. This transform circuitry includes an actual computational unit, which in turn contains multiple multipliers and adders.

In this example, where the C-language implementation is hardwired, the transform circuitry implements each stage of the C-implementation separately and it works in pipeline fashion and generates 32 transformed coefficients in one clock cycle with initial latency of 7 cycles (as there are 8 stages in C-implementation). Another example implementation is to have only one single stage and loop back the output 7 more times to get the final 32 coefficients. Here, it provides 32 coefficients in 8 cycles. In latter case, it costs more multipliers and adders, which contributes to 70% more hardware than the former implementation. However, even further efficiencies may be gained in the latter case.

Subsequently the output of 1-D transform circuitry is passed to a transpose buffer where it is stored in row-wise fashion and fed to 2-D transform circuitry in column fashion. Hence, the transpose buffer first completely stores all 32 rows, each having 32 coefficients, and then starts feeding 32 coefficients of the 32 rows 2-D transform circuitry column-wise. 2-D transforms may be the same as 1-D transform block and produce 32 column coefficients either in 1 cycle or in 8 cycles.

In a typical implementation, a pre-transform buffer may always provide 32 sample values (e.g., for 32×32 sized block), which are processed by 1-D transform in 1 cycle or 8 cycles. There may be memory storage inefficiency in such techniques as read bandwidth is always 32 coefficients from pre-transform buffer irrespective of budget count. Another potential issue may be in area inefficiency of transform circuitry (1D and 2D) where there are multiple 8 stages in pipeline fashion or in feedback fashion with single stage that results in performance inefficiency. Since each transform circuitry may need 32 coefficients in one iteration, the transpose buffer may be implemented with registers, since the transpose buffer writes row-wise and reads column wise. A memory may not be used in this scenario, since column wise read fashion is possible in register based implementation where more hardware may be needed. The above example was described with respect to a 32×32 sized block of sample values, but applies for other sized blocks as well, and examples with respect to other sized blocks is provided in more detail below.

Accordingly, this disclosure describes transform circuitry which can be easily scaled to match with memory read bandwidth and performs transformation within a given cycle budget. The transform circuitry may be for the VP9 codec, but may be used for the HEVC codec as well, and generally for various video coding standards. The transform circuitry described in this disclosure need not necessarily conform to a specific video coding standard, and may be useable where a block of data is being transformed (e.g., DCT or DST or inverse DCT or inverse DST).

FIG. 4 is a block diagram illustrating an example transform circuitry. The example of transform circuitry 168 illustrated in FIG. 4 may be usable for transform processing unit 104 and inverse transform processing unit 110 of FIG. 2, and inverse transform processing unit 156 of FIG. 3. For instance, transform processing unit 104 and inverse transform processing unit 110 and inverse transform processing unit 156 may perform inverse operations relative to one another, and therefore similar circuitry may be used.

The example illustrated in FIG. 4 may address, but is not required to, the drawbacks of other designs and makes it a scalable implementation. Transform circuitry 168 may match memory read bandwidth and number of computation units to meet the given performance requirement and thus becomes area optimal solution.

FIG. 4 illustrates pre-transform buffer 170, which may be part of video data memory 101 (FIG. 2) or video data memory 151 (FIG. 3), as applicable, part of another memory, or its own separate memory, with capacity to store 32×32 coefficients (merely as one non-limiting example) but, provides read bandwidth of M sample values/cycle. These M sample values are fed to 1-D transform circuit 174 via flip-flop 172 (e.g., a D flip-flop). Flip-flop 172 is illustrated external to transform circuit 174 for ease of illustration. Flip-flop 172 may be part of transform circuit 174, and in this disclosure, when transform circuit 174 is described as receiving values from pre-transform buffer 170, such reception is via flip-flop 172.

For instance, in the example where transform circuitry 168 is part of transform processing unit 104, pre-transform buffer 170 may be part of video data memory 101 and may store residual sample values (e.g., residual between current block and predictive block). In the example where transform circuitry 168 is part of inverse transform processing unit 156, pre-transform buffer 170 may be part of video data memory 151 and may store frequency domain sample values (or coefficient values), which are frequency domain representations of the residual sample values.

To make transform circuitry 168 scalable, one or more computation units are used. As illustrated, 1-D transform circuit 174 includes computation units 176A-176N (collectively computation units 176), the N computation units 176 may contribute in calculating performance of the example techniques.

In the example illustrated in FIG. 4, a controller circuit may be configured to control the operations of the various illustrated circuits. One example of the controller circuit is prediction processing unit 100 for video encoder 20. Another example of the controller circuit is prediction processing unit 152. However, the controller circuit may be a separate circuit as well.

Figure 5:
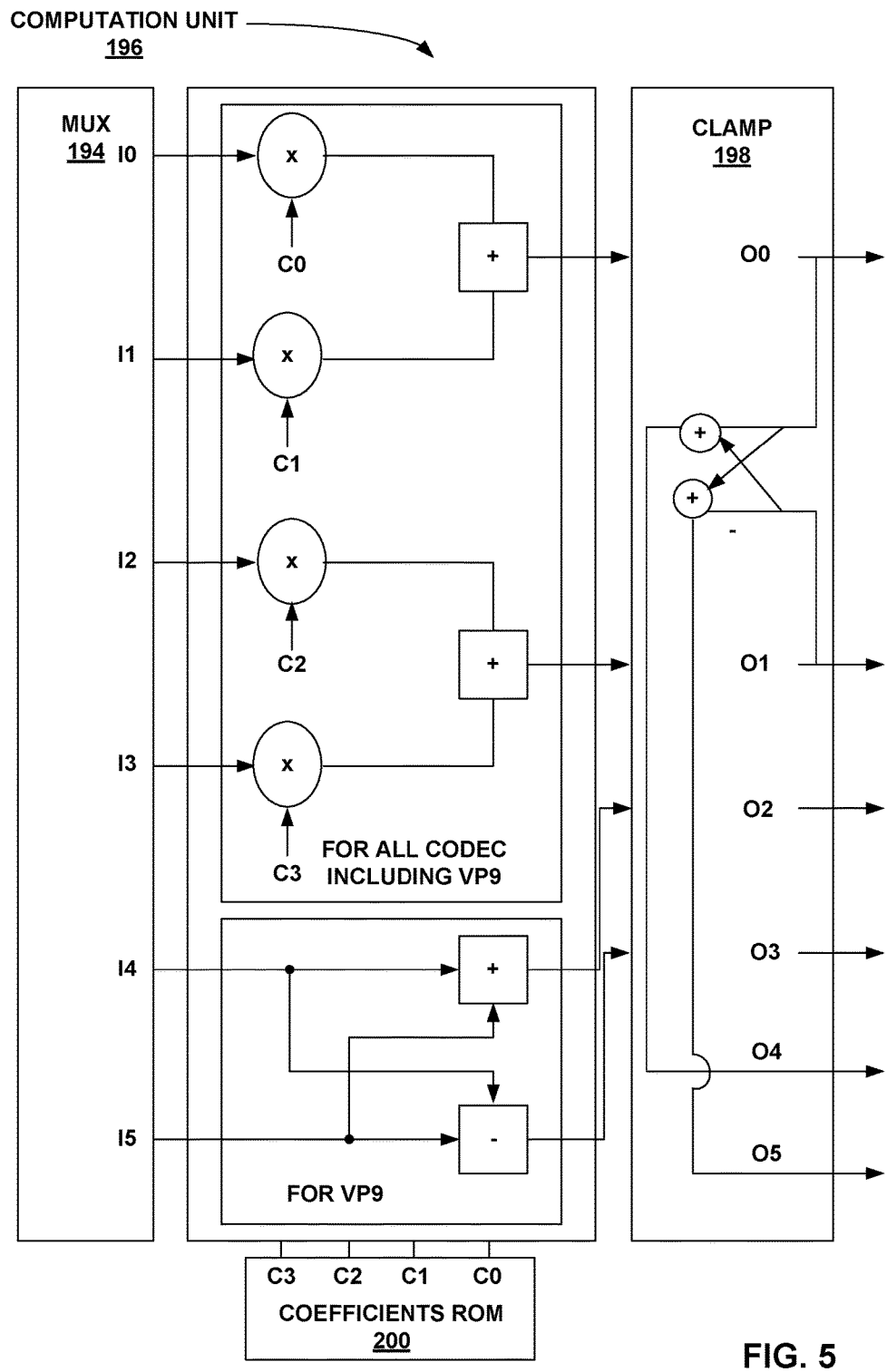
FIG. 5 is a block diagram illustrating an example computation unit of a transform circuitry of FIG. 4.

In some examples, one or more of computation units 176 may include 4 multipliers and 4 adders as illustrated in FIG. 5. FIG. 5 is a block diagram illustrating an example computation unit of a transform circuitry of FIG. 4. For instance, FIG. 5 illustrates computation unit 196. Computation unit 196 includes a plurality of adders, subtractors, and multipliers. For example, the multipliers receive data from MUX 194, and respective scales from coefficients ROM 200, which may be part of video data memory 101 (FIG. 2) or video data memory 151 (FIG. 3), part of other memory, or its own separate memory. Most all video codecs may share the same design, but for VP9 additional adders and subtractors may be needed (e.g., those from lines I4 and I5 of MUX 194). Computation unit 196 outputs to clamp 198 for further processing for clamping the output value to a value between a maximum and/or minimum value.

The various stages/equations of VP9 decode C-model may be re-arranged to fit the computation unit model, and to achieve performance boost as well. For instance, the C-implementation implements VP9 decode with 8 stages for 32×32 sized blocks while the example techniques may be based on rearranging those equations to map into the example design of transform circuitry 168 by resolving dependency between the stages and may achieve only 5 stages implementation. It may be possible for transform circuitry 168 to provide approximately 40% performance boost. The 5 stage implementation of transform circuitry 168 re-uses computation units 176 for calculating intermediate stages values and feeding the output back to computation units 176. This looping/number of stages is done by feedback path 178 (e.g., a hardwired connection) which varies with transform sizes for a given M and N defined above. The 5 stage implementation, rather than 8 stages, is illustrated below with the description of the pseudo-code for the 8 stage transform implementation.

1-D transform circuit 174 reads M sample values from pre-transform buffer 170 and generates 32, in this example, intermediate values in several clocks that depends on the value of M and N. The 32 intermediate values, in this example, may be further processed by 2-D transform circuit 186. The output values from 1-D transform circuit 174, which is 32 intermediate values in this example, may be constant for 32×32 transform size irrespective of M and N.

For example, transform circuit 174 may process the M sample with computation units 176A-176N to generate the intermediate values. As part of processing the M sample values to generate the intermediate values, transform circuit 174 may feedback temporary values from the output of computation units 176A-176N to input of computation units 176A-176N.

As illustrated in FIG. 5, computation unit 196 receives inputs I0-I3, and inputs I4 and I5 are generally reserved only for feedback. In an example where computation unit 176A is the same as computation unit 196, computation unit 176A may receive four of the M sample values via inputs I0-I3. For example, the controller circuit may control MUX 194 to output four of the M sample values to computation unit 176A. The same may apply for the other computation units 176B-176N.

As an example to assist with understanding, assume that the block size is 32×32, M equals 16 (e.g., 16 sample values are read per clock cycle), and N equals 8 (e.g., there are 8 computation units 176). In this example, the controller circuit may cause the MUX of computation unit 176A to output sample values 0-3 as inputs I0-I3 of computation unit 176A to the multipliers of computation unit 176A, as illustrated in FIG. 5. The controller circuit may cause the MUX of computation unit 176B to output sample values 4-7 as inputs I0-I3 of computation unit 176B to the multipliers of computation unit 176B, as illustrated in FIG. 5. The controller circuit may cause the MUX of computation unit 176B to output sample values 8-11 as inputs I0-I3 of computation unit 176C to the multipliers of computation unit 176C, as illustrated in FIG. 5. The controller circuit may cause the MUX of computation unit 176D to output sample values 12-15 as inputs I0-I3 of computation unit 176D to the multipliers of computation unit 176D, as illustrated in FIG. 5. At this point, the controller circuit reads the M (e.g., 16) sample values from pre-transform buffer 170.

However, there are eight computation units 176, but only four computation units 176A-176D received sample values. In some examples, for the remaining computation units 176, the controller circuit may repeat the sample values provided to the other computation units 176. For example, computation unit 176E may receive the same values as computation unit 176A, computation unit 176F may receive the same values as computation unit 176B, and so forth until all computation units 176 receive sample values.

Each one of computation units 176 may perform their respective operations, as illustrated in FIG. 5. For instance, each one of computation units 176 may multiply their respective I0 values with respective C0, multiply their respective I1 values with respective C1, and add the resulting value. Also, each one of computation units 176 may multiply their respective I2 values with respective C2, multiple their respective I3 values with respective C3, and add the resulting value. The I4 and I5 values for the respective computation units 176 may be values fed back via feedback path 178.

For example, feedback path 178 outputs receives values from outputs of computation units 176 and outputs these values to flip-flop 172. Flip-flop 172 may then forward these values to computation units 176. For example, the controller circuit may cause flip-flop 172 to either output from pre-transform buffer 170 or feedback path 178. In some examples, rather than outputting to flip-flop 172, feedback path 178 may output to respective MUXes of computation units 176. In such examples, the controller circuit may control respective MUXes of computation units 176 to have respective I0-I3 inputs receive values from pre-transform buffer 170 or feedback path 178.

For VP9, respective inputs I4 and I5 may always receive values from feedback path 178, and inputs I4 and I5 may not be needed for other types of transforms, such as those in the HEVC video coding standard. As an example, as illustrated in FIG. 5, clamp 198 may generate outputs O0, O1, O2, and O3 based on the output from computation unit 196. An adder may add the outputs of O0 and O1, and a subtractor may subtract based on output O0 and O1. The result of the addition may be O4, and the result of the subtraction may be O5. The output O0 equals I0*C0+I1*C1, the output O1 equals I2*C2+I3*C3, the output O2 equals I4+I5, but in some cases, may just equal I4 (e.g., the addition is not always necessary), the output O3 equals I4-I5, but in some cases, may just equal I5 (e.g., the subtraction is not always necessary), the output O4 is equal to O0+O1, and the output O5 is equal to O0-O1.

The outputs O2-O5 may each be feedback values that are fed back to respective inputs of computation units 176. As an example, as described above, for a 32×32 sized block, in a first stage, each one of computation units 176 may generate respective ones of outputs O0-O5. Feedback path 178 may take the respective outputs O2-O5 and feed back these values to respective computation units 176. Based on the stage, O2-O5 may be inputs to any one of I0-I5. As an example, for the second stage, each one outputs O4 and O5 may be inputs I4 and I5. Which ones of outputs O2-O5 are fed back to which ones of I0-I5 may predetermined, and example sets of operations are described with respect to FIGS. 9-12 that indicate which ones of I0-I5 receive which ones of O2-O5 as inputs. In this disclosure, outputs O0-O5 may be considered as temporary values that are being updated until the final stage, and which point outputs O0-O5 represent the intermediate values or the final transform values based on whether the operations are being performed by 1-D transform circuit 174 or 2-D transform circuit 186.

Accordingly, in one clock cycle, computation units 176 receive the M sample values stored in pre-transform buffer 170, where the M sample values are values of a row or column of an A×B sized block of sample values. M is less than A or B. Each one of computation units 176 perform respective operations (e.g., multiplying, adding, and clamping). The result of the operations may be temporary values, and these temporary values may be fed back to computation units 176 via feedback path 178.

Which ones of computation units 176 receive which ones of the fed back temporary values may be based on the size of the block, and the operation stage. For instance, after another processing round, computation units 176 may generate updated temporary values (e.g., new values for O2-O5) that are fed back. The number of times that the temporary values are fed back may be based on the size of M and N. In some examples, the controller circuit may be preprogrammed with feeding back the temporary values the appropriate number of times based on M (e.g., number of sample values read per cycle) and N (e.g., number of computation units 176). That is, when feeding back a temporary value, a first one of the N computation units 176 may pass the temporary value to an input of a second one of the N computation units 176, where the first and second ones of computation units 176 may be the same ones of computation units 176 or different computation units 176.

One example for the operations and feedback for 32×32 sized block of sample values is illustrated in FIGS. 9A-9C. One example for the operations and feedback for 8×8 sized block of sample values is illustrated in FIGS. 10A-10C. One example for the operations and feedback for 16×16 sized block of sample values is illustrated in FIGS. 11A-11C. One example for the operations and feedback for 4×4 sized block of sample values is illustrated in FIGS. 12A-12C.

At the conclusion of the operations, the controller circuit may cause transform circuit 174 to store the intermediate values in transpose buffer 182 via flip-flop 180. Similar to flip-flop 172, flip-flop 180 may be part of transform circuit 174 but is illustrated external to transform circuit 174 simply for ease of illustration and description.

Transpose buffer 182 receives 32, as an example for 32×32 sized block of intermediate values, from 1-D transform circuit 174 (e.g., intermediate values) via flip-flop 180. In some examples, transpose buffer 182 may not use 32×32 local buffer to store the incoming 32×32 intermediate values. Transpose buffer 182 may use a smaller size (e.g., make use of existing local buffer of size 2×4×32 which is there to support other codecs). A local buffer of size 2×4×32 means a first and a second internal buffer, each of size 4×32. Transpose buffer 182 may store a first four rows or columns of 32 intermediate values in a first internal buffer, and store a next four rows or columns of 32 intermediate values in a second internal buffer. Therefore, transpose buffer 182 may store a first set of the intermediate values (e.g., 8 rows or columns of 32 intermediate values each).

For the remaining 24 rows or columns, the controller circuitry may cause transpose buffer 182 to send back to pre-transform buffer 170, via feedback path 179, to store onto same location from where sample values were read by current values by 1-D transform circuit 174. Transpose buffer 182 may be able to store 1-D transform circuit 174 output to the same location in pre-transform buffer 170 of where a row or column of data was stored because VP9 algorithm produces full row/column values all together and once transformed, space is free. This hence, may not cause area increments in transpose buffer 182. Once 1-D transform circuit 174 completes one full transform of size 32×32, transpose buffer 182 internal buffer of size 8×32 may be completely filled (e.g., each of the two 4×32 sized internal buffers may be filled) and the controller circuit writes the 24×32 intermediate values to pre-transform buffer 170. Accordingly, pre-transform buffer 170 may store a second set of the intermediate values (e.g., 24 rows or columns of 32 intermediate values each). The 24×32 intermediate values are to be later retrieved for storage in transpose buffer 182, as described below.

At this point, the controller circuit may cause transpose buffer 182 to start sending M intermediate values from a column to 2-D transform circuit 186 via flip-flop 184. Transpose buffer 182 may complete sending data from first internal buffer of transpose buffer 182 and then starts sending data from second internal buffer of transpose buffer 182. For instance, while transpose buffer 182 sends data from second 4×32 internal buffer, the controller circuit causes transpose buffer 182 to starts storing 4×32 data from pre-transform buffer 170, via forward path 181, to first internal buffer which is of same size as 4×32. This way the first and second internal buffers of size 4×32 of transpose buffer 182 each work in ping-pong fashion (e.g., alternating storing in the internal buffers, and outputting from the other one of the internal buffers). Once transpose buffer 182 completes sending second 4×32 buffer data, the controller circuit causes transpose buffer 182 to start sending data from first 4×32 buffer and causes transpose buffer 182 to fill second 4×32 buffer in the meanwhile from the second set of intermediate values stored in pre-transform buffer 170 via forward path 181.

2-D transform circuit 186 is similar to 1-D transform circuit 174 and may perform similar operations. For example, 2-D transform circuit 186 reads M intermediate values/clock from transpose buffer 182 via flip-flop 184, and completes reading 32 intermediate values and generates 32 final transform values by looping temporary values to computation units 188A-188N via feedback path 190 over a period of cycle. Computation units 188A-188N may be similar architecture as computation units 176A-176N. The output of 2-D transform circuit 186 may be clocked out by flip-flop 192, and may be the final transform values.

Accordingly, FIG. 4 provides an example for a device configured to perform operations in accordance with disclosure. The term "device" here is used to refer to any configuration of components. For example, the device may be source device 12 or destination device 14, video encoder 20 or video decoder 30, transform processing unit 104 or inverse transform processing unit 156, or transform circuitry 168. Therefore, the device configured to perform operations in accordance with this disclosure may be a microprocessor, integrated circuitry, or a wireless communication device.

As illustrated in FIG. 4, the device includes pre-transform buffer 170, transpose buffer 182, and transform circuit 174. Transform circuit 174 may be configured to receive M sample values of the video data from pre-transform buffer 170, wherein M represents a non-zero integer value, process the M coefficients with N computation units 176A-176N of transform circuit 174 to generate intermediate values, wherein processing the M coefficients to generate the intermediate values includes feeding back temporary values from output of one or more of the N computation units to input of one or more of the N computation units via feedback path 178, and wherein N represents a non-zero integer value. For example, when feeding back a temporary value, a first one of the N computation units 176 may pass the temporary value to an input of a second one of the N computation units 176, where the first and second ones of computation units 176 may be the same ones of computation units 176 or different computation units 176. Transform circuit 174 may store a first set of the intermediate values in transpose buffer 182 (e.g., in a first of the two 4×32 internal buffers). Pre-transform buffer 170 may store a second set of the intermediate values that are to be later retrieve for storage in transpose buffer 182 (e.g., in the memory space used by sample values that are now available).

The device also includes transform circuit 186. Transpose buffer 182 may be configured to output the first set of intermediate values to transform circuit 186. During the outputting of the first set of intermediate values, transpose buffer 182 is configured to store, from pre-transform buffer 170, the second set of intermediate values. For example, the controller circuit may cause transpose buffer 182 to output the first set of intermediate values to transform circuit 186. During the outputting of the first set of intermediate values, the controller circuit may retrieve the second set of intermediate values from pre-transform buffer 170, and store the second set of intermediate values, retrieved from pre-transform buffer 170, in transpose buffer 182.

In some examples, storing the first set of intermediate values includes storing a first plurality of the first set of intermediate values in a first internal buffer (e.g., 4×32 intermediate values in a first 4×32 internal buffer), and storing a second plurality of the second set of intermediate values in a second internal buffer (e.g., additional 4×32 intermediate values in a second 4×32 internal buffer). In this example, transpose buffer 182 may output the first plurality of the first set of intermediate values from the first internal buffer to transform circuit 186. Subsequent to outputting the first plurality of the first set of intermediate values, transpose buffer 182 may output the second plurality of the first set of intermediate values from the second internal buffer to the 2-D transform circuit 186. During the outputting of the second plurality of the first set of intermediate values, the first internal buffer of transpose buffer 182 may store a plurality of the second set of intermediate values from pre-transform buffer 170, via forward path 181. For example, the first and second internal buffers of transpose buffer 182 may alternate output to transform circuit 186, and store intermediate values from pre-transform buffer 170 in the other one of the first or second internal buffer (e.g., alternating outputting from one of the first internal buffer or the second internal buffer to transform circuit 186, and storing, from pre-transform buffer 170, in the other one of the first internal buffer or the second internal buffer).

The above 1-D/2-D Transform block completes their transform with performance F which is define as stated below:

Peak Performance, $P=(32/M'+C*8/N)$ cycles per 32 coefficients  ()

Where, C=constant for this implementation=3
M=read Bandwidth of Ram of Pre-Transform Block
N=numbers of Basic Unit in 1-D/2-D Transform Block
M'=min (M, 2*N)—reads if value of M is greater than twice of value of N, the 1-D/2-D transform design will perform as it has read bandwidth equal to 2*N.

The Overall performance of proposed architecture for M=16 and N=8 for 32×32 transform can be calculated as follows:

$P_1 = 32 *$ cycles in transforming 32 $coeff.$ of a row by 1-$D$ transform =

$$32*(32/16+3*8/8) \text{ cycle} = 32*5 = 160 \text{ cycles}$$

$P_2 =$ cycles taken by Transpose Block =

(cycles in filling up 4×32 buffer from RAM of

Pre-Transform Block – cycles taken by 2-$D$ transform block in consuming 4×32 buffer) *

(transform size – 2 * buffer width) / buffer width =

$$(32-20)*(32-2*4)/4 = 12*6 = 72 \text{ cycles}$$

$P_3 = P_1 = 160$ cycles

Overall Performance for 32×32 transform size, $P_{overall}=P_1+P_2+P_3=160+72+160=392$ cycles.

The example techniques may provide the following advantages in some cases, but achieving these advantages is not necessary. The scalability of this architecture is achieved by varying the number of computation units N and width of memory M.

Transform circuitry 168 may be configured so as to scale the read bandwidth of pre-transform buffer 170 which may result in area saving for taller RAMs. Transform circuitry 168 may be configured so as to scale the number of computation units (proportional to number of multipliers) in each row/column of 1-D transform circuit 174 and 2-D transform circuit 186 which may directly affect area of architecture for various performance. By re-using the computation units, transform circuitry 168 may be configured in a way where the C-model VP9 decode equations are rearranged to map into computation units and achieves performance boost by completing it in 5 stages. In transform circuitry 168, the local buffer size of transpose buffer 182 may remain restricted to store 2×4×32 coefficients. In transform circuitry 168, pre-transform buffer 170 may be used to store transpose coefficients from transpose buffer 182 without putting any extra buffer and without affecting data path of other codecs.

Figure 6:
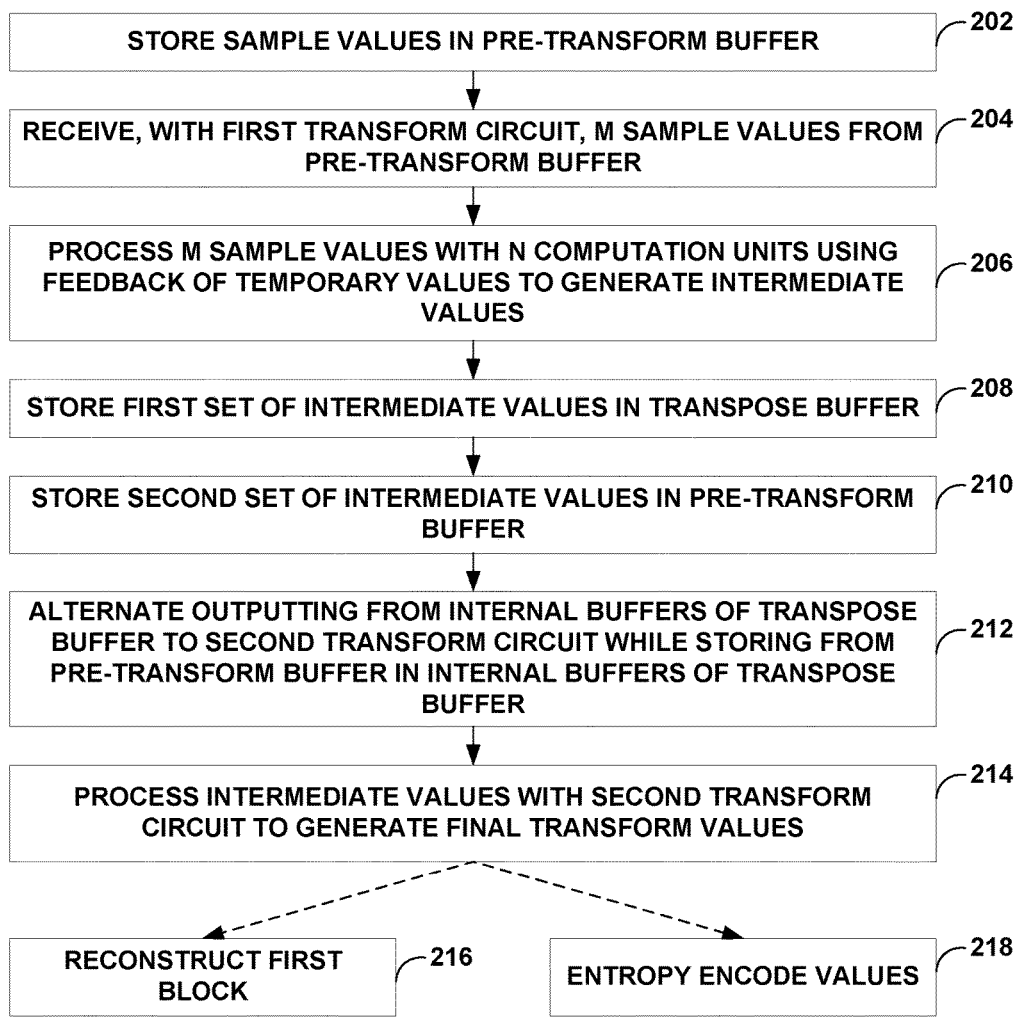
FIG. 6 is a flowchart illustrating an example method of operation in accordance with one or more examples.

FIG. 6 is a flowchart illustrating an example method of operation in accordance with one or more examples. For example, FIG. 6 illustrates an example method of operation of video encoder 20, such as by transform processing unit 104 and entropy encoding unit 118, or an example method of operation of video decoder 30, such as by inverse transform processing unit 156 and motion compensation unit 164 or intra-prediction processing unit 166.

A controller circuit may store sample values in pre-transform buffer 170 (202). For example, prediction processing unit 100 may store residual sample values, which is the difference between a current block and a predictive block, in video data memory 101 that includes pre-transform buffer 170. As another example, prediction processing unit 152 may store frequency domain sample values (e.g., coefficient values) generated by inverse quantization unit 154 in video data memory 151 that includes pre-transform buffer 170.

Transform circuit 174 may receive M sample values from pre-transform buffer 170 (204). M is a non-zero integer value. For example, if pre-transform buffer 170 stored sample values for an A×B sized block, where A and B are non-zero integer values, then M may be less than A or B. In some examples, A equals B, and hence, M may be less than A and B.

Transform circuit 174 may process the M sample values with N computation units 176 using feedback path 178 to feedback temporary values to generate intermediate values (206). For example, to process the M sample values to generate the intermediate values includes feeding back temporary values from output of one or more of the N computation units 176 to input of one or more of the N computation units 176 (when feeding back a temporary value, a first one of the N computation units 176 may pass the temporary value to an input of a second one of the N computation units 176, where the first and second ones of computation units 176 may be the same ones of computation units 176 or different computation units 176). As each of computation units 176 performs their respective operations on inputs I0 to I5, the resulting O0 to O3 values may be temporary values, one or more of which, the controller circuit feeds back to computation units 176 via feedback path 178. The controller circuit may cause transform circuit 174 to repeatedly perform these operations until transform circuit 174 generates all of the intermediate values.

Transpose buffer 182 may store a first set of intermediate values (208), and pre-transform buffer may store a second set of intermediate values (210). As an example, transpose buffer 182 may include a first internal buffer and a second internal buffer. The controller circuit may store a first plurality of the first set of intermediate values in the first internal buffer of transpose buffer 182, and store a second plurality of the first set of intermediate values in the second internal buffer of transpose buffer 182.

For instance, the controller circuit may cause transform circuit 174 to store intermediate values (e.g., the first set of intermediate values) in the first and second internal buffers of transpose buffer 182 until the first and second internal buffers are full. The controller circuit may cause transform circuit 174 to store the remaining intermediate values (e.g., the second set of intermediate values) in pre-transform buffer 170 in locations that stored sample values already read by transform circuit 174. The controller circuit may store the second set of intermediate values in pre-transform buffer 170 via feedback path 179 (as one example), but may store values in pre-transform buffer 170 via other paths, including a path from the output of flip-flop 180 back to pre-transform buffer 170.

The first and second internal buffers may alternate outputting to transform circuit 186, while storing from pre-transform buffer 170 in first and second internal buffers of transpose buffer 182 (212). For example, transpose buffer 182 (e.g., one of first or second internal buffer) may output the first set of intermediate values to transform circuit 186, and during the outputting of the first set of intermediate values, transpose buffer 182 (e.g., other one of first or second internal buffer) may store, from pre-transform buffer 170, the second set of intermediate values. For example, the controller circuit may cause transpose buffer 182 to output the first set of intermediate values to transform circuit 186. During the outputting of the first set of intermediate values, the controller circuit may retrieve the second set of intermediate values from pre-transform buffer 170, and store the second set of intermediate values, retrieved from pre-transform buffer 170, in transpose buffer 182.

Transform circuit 186 may process the intermediate values generated by transform circuit 174 to generate final transform values (214). One example of the final transform values includes a first plurality of residual sample values representing differences between a first current video block and a first predictive block, where the sample values stored in pre-transform buffer 170 comprise a first plurality of frequency domain sample values. Another example of the final transform values includes a second plurality of frequency domain sample values indicative of residual between a second current video block and a second predictive block, where the sample values stored in pre-transform buffer 170 comprise a second plurality of residual sample values.

After transform circuit 186 generates the final transform values, the next operation may be based on whether the operations are being performed by video decoder 30 or by video encoder 20, as illustrated by the dashed lines. For instance, in one example, video decoder 30 may reconstruct the first current video block based on the first predictive block and the first plurality of residual samples (216). For example, motion compensation unit 164 or intra-prediction processing unit 166 may add the residual samples generated by inverse transform processing unit 156 to the predictive block to reconstruct the current video block. In another example, video encoder 20 may entropy encode a plurality of values based on the second plurality of frequency domain sample values (218). For example, quantization unit 106 may quantize the output from transform processing unit 104, which are the frequency domain sample values. Entropy encoding unit 118 may entropy encode the output from quantization unit 106. In examples where quantization is skipped, entropy encoding unit 118 may entropy encode the output of transform processing unit 104 (e.g., the frequency domain sample values).

Table 1 lists down 4 different combination of M and N and the performance of 1-D/2-D transform circuit 174 and transform circuit 186, respectively, with those combinations for transform size of 32×32. Table 1 also lists the number of multiplier in 1-D/2-D transform circuit 174 and transform circuit 186 and memory size of pre-transform buffer 170.

TABLE 1

|  | Config-1 | Config-2 | Config-3 | Config-4 |
|---|---|---|---|---|
| Read Bandwidth, M | 16 | 16 | 32 | 32 |
| Number of BUs, N | 8 | 16 | 16 | 32 |
| Performance, P | 160 | 112 | 80 | 56 |
| Number of Multipliers | 32 | 64 | 64 | 128 |
| RAM size | 16 × 64 | 16 × 64 | 32 × 32 | 32 × 32 |

Figure 7:
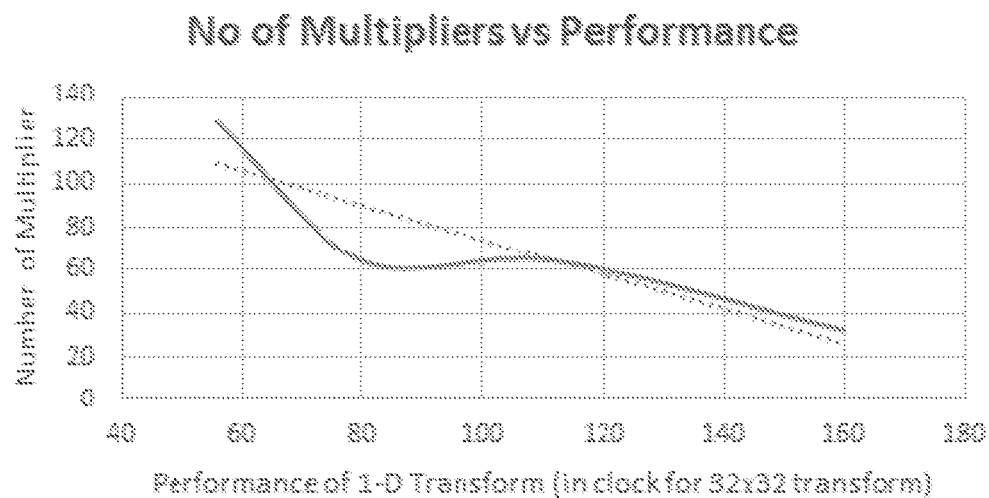
FIG. 7 is a graph illustrating number of multipliers versus performance of performing a transform in accordance with one or more examples.
Figure 8:
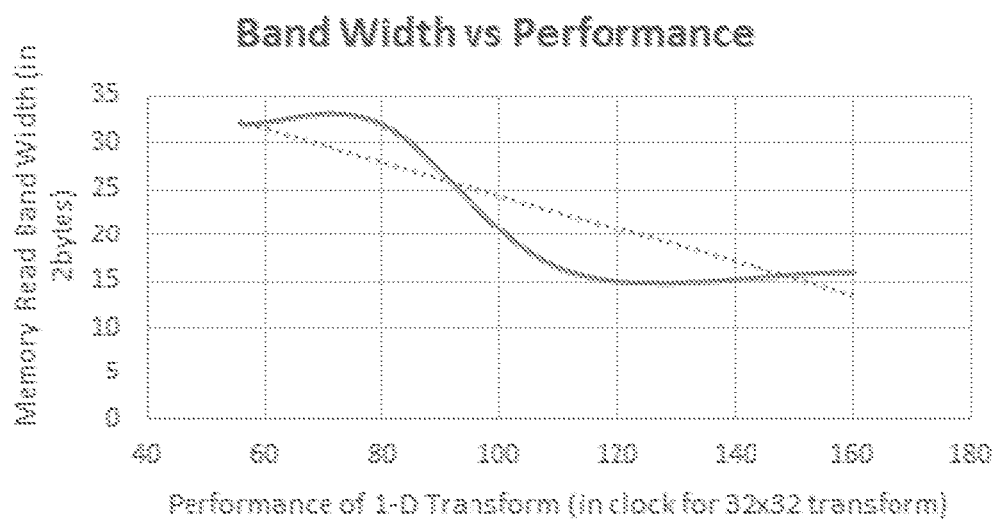
FIG. 8 is a graph illustrating bandwidth versus performance of performing a transform in accordance with one or more examples.

FIG. 7 is a graph illustrating number of multipliers versus performance of performing a transform in accordance with one or more examples. FIG. 8 is a graph illustrating bandwidth versus performance of performing a transform in accordance with one or more examples. FIGS. 7 and 8 show the number of multipliers and pre-transform buffer 170 read bandwidth with respect to given performance (given cycle count to 1-D transform circuit 174 to complete one 32×32 transform). As shown in FIGS. 7 and 8, with increase in given cycle count, both number of multiplier and pre-transform buffer 170 read bandwidth scales down proportionately.

The computer program listing appendix, included in the application and incorporated by reference in its entirety, is example of software instructions for performing operations of a transform (e.g., inverse DCT) to generate 32 intermediate values for a 32×32 sized block. The instructions are arranged in 8 stages. With the rearranging of the operations, it may be possible for transform circuit 174 and transform circuit 186 to perform the operations in 5 stages.

FIGS. 9A-9C are tables illustrating example operations for generating 32 intermediate values for 32×32 sized block. FIGS. 9A-9C should be read as continuation of the same table. For instance, the first column of FIG. 9B is the next column from the last column of FIG. 9A, and the first column of FIG. 9C is the next column from the last column of FIG. 9B.

The example of FIGS. 9A-9C are based on M equaling 16 (e.g., 16 sample values are read from pre-transform buffer 170 per clock cycle), and N equaling 8 (e.g., 8 computation units 176). In FIGS. 9A-9C, I0-I5, C0-C3, and O0-O4 are the same as in FIG. 5. The variable D0 and D1 are the same as O0 and O1, but reordered. As an example way to understand FIGS. 9A-9C, in the above code, for stage 1, there are the following equations:

temp1=input[1]*cospi_31_64−input[31]*cospi_1_64;

temp2=input[1]*cospi_1_64+input[31]*cospi_31_64;

step1[16]=dct_const_round_shift(temp1);

step1[31]=dct_const_round_shift(temp2);

temp1=input[17]*cospi_15_64−input[15]
   *cospi_17_64;

temp2=input[17]*cospi_17_64+input[15]
   *cospi_15_64;

step1[17]=dct_const_round_shift(temp1);

step1[30]=dct_const_round_shift(temp2);

In FIGS. 9A-9C, in the first line, I0 receives inp[1], I1 receives inp[31], C0 equals 31_64, and C1 equals −1_64. FIG. 5 illustrates I0*C0+I1*C1=O0, which, with respect to the example illustrated in FIGS. 9A-9C, is inp[1]*31_64+inp[31]*(−1_64). This equation corresponds to input[1]*cospi_31_64−input[31]*cospi_1_64=temp1 of stage 1. In FIG. 5, O0 is clamped, which corresponds to step1[16]=dct_const_round_shift(temp1). Accordingly, O0 equals step1[16]. The second line in FIGS. 9A-9C illustrates the way to determine the step1[31] value, and the next two lines in FIGS. 9A-9C illustrate the way to determine the step1[17] and step1[30] values. For example, O1 equals step1[17]. Each of the respective computation units 176 may be performing similar operations.

As described above, in some examples, the ordering of the operations may be changed so that the transform that requires 8 stages in the software instructions can be performed in 5 stages. Accordingly, FIGS. 9A-9C illustrates the operations in the 5 stages (e.g., 1 through 5 in the left column, where the operations proximate to those values represents the operations in its respective stage).

As one example, as illustrated in the end of first row in FIGS. 9A-9C, the value for O4 is stored in step2[16], and the value for O5 is stored in step2[17]. As illustrated in FIG. 5, the value of O4 is equal to O0+O1, and the value of O5 is equal to O0-O1. In the example illustrated in FIGS. 9A-9C, O0 equals step1[16], which equals D0, and O1 equals step1[17], which equals D1. Therefore, step2[16], which equals O4, equals step1[16]+step1[17], and step2[17], which equals O5, equals step1[16]-step1[17].

Accordingly, these operations are performed in stage 1 of the stages of operations performed by transform circuitry 168. For instance, in stage 1 of the stage of operations performed by transform circuitry 168, transform circuitry 168 determines the value of step2[16] as step1[16]+step1[17], and determines the value of step2[17] as step1[16]−step1[17].

In the C-language implementation, stage 2 includes the following instructions:

step2[16]=step1[16]+step1[17];

step2[17]=step1[16]-step1[17].

Accordingly, although the C-language implementation indicates determining step2[16] and step2[17] as part of stage 2, with the example techniques described in this disclosure, these operations may be moved to stage 1. With such modifications, the example techniques result in performing the transform in 5 stages, rather than 8 stages.

As illustrated in FIGS. 9A-9C, for the first stage, the I4 and I5 inputs are unused. However, for stage 2 in FIGS. 9A-9C, in the first line of stage 2, I4 and I5 are illustrated as receiving the value of step2[16] (e.g., O4) and step2[17] (e.g., O5) as feedback via feedback path 178. In the operations for stage 2, the respective computation units 176 may receive values from pre-transform buffer for inputs I0-I3, and inputs I4 and I5 equal the previous values for O4 and O5. Computation units 176 may perform their respective operations and generate the O0-O5 outputs, which are fed back for stage 3, and so forth until all five stages are complete and the values for O2-O5 are the intermediate values that computation units 188 process. Computation units 188 may perform similar operations, and generate the final transform values.

The following is example of software instructions for performing the operations of a transform (e.g., inverse DCT) to generate 8 intermediate values for an 8×8 sized block. The instructions are arranged in 4 stages. However, with the rearranging of the operations, it may be possible for transform circuit 174 and transform circuit 186 to perform the operations in 3 stages using only a quarter of the computation units 176 than the ones needed for 32×32 sized blocks.

---

C-language code for 8 × 8 transform

```
Int32 step1[8], step2[8];
Int32 temp1, temp2;
  // stage 1
  step1[0] = input[0];
  step1[2] = input[4];
  step1[1] = input[2];
  step1[3] = input[6];
  temp1 = input[1] * vp9_cospi[28] - input[7] * vp9_cospi[4];
  temp2 = input[1] * vp9_cospi[4] + input[7] * vp9_cospi[28];
  step1[4] = vp9_dct_const_round_shift(temp1);
  step1[7] = vp9_dct_const_round_shift(temp2);
  temp1 = input[5] * vp9_cospi[12] - input[3] * vp9_cospi[20];
  temp2 = input[5] * vp9_cospi[20] + input[3] * vp9_cospi[12];
  step1[5] = vp9_dct_const_round_shift(temp1);
  step1[6] = vp9_dct_const_round_shift(temp2);
  // stage 2 - even half
  temp1 = (step1[0] + step1[2]) * vp9_cospi[16];
  temp2 = (step1[0] - step1[2]) * vp9_cospi[16];
  step2[0] = vp9_dct_const_round_shift(temp1);
  step2[1] = vp9_dct_const_round_shift(temp2);
  temp1 = step1[1] * vp9_cospi[24] - step1[3] * vp9_cospi[8];
  temp2 = step1[1] * vp9_cospi[8] + step1[3] * vp9_cospi[24];
  step2[2] = vp9_dct_const_round_shift(temp1);
  step2[3] = vp9_dct_const_round_shift(temp2);
  // stage 3 - even half
  step1[0] = step2[0] + step2[3];
  step1[1] = step2[1] + step2[2];
  step1[2] = step2[1] - step2[2];
  step1[3] = step2[0] - step2[3];
  // stage 2 - odd half
  step2[4] = step1[4] + step1[5];
  step2[5] = step1[4] - step1[5];
  step2[6] = -step1[6] + step1[7];
  step2[7] = step1[6] + step1[7];
  // stage 3 -odd half
  step1[4] = step2[4];
  temp1 = (step2[6] - step2[5]) * vp9_cospi[16];
  temp2 = (step2[5] + step2[6]) * vp9_cospi[16];
  step1[5] = vp9_dct_const_round_shift(temp1);
  step1[6] = vp9_dct_const_round_shift(temp2);
  step1[7] = step2[7];
  // final stage
  output[0] = step1[0] + step1[7];
  output[1] = step1[1] + step1[6];
  output[2] = step1[2] + step1[5];
  output[3] = step1[3] + step1[4];
  output[4] = step1[3] - step1[4];
  output[5] = step1[2] - step1[5];
  output[6] = step1[1] - step1[6];
  output[7] = step1[0] - step1[7];
```

---

FIGS. 10A-10C are tables illustrating example operations for generating 8 intermediate values for 8×8 sized block. FIGS. 10A-10C should be read as continuation of the same table. For instance, the first column of FIG. 10B is the next column from the last column of FIG. 10A, and the first column of FIG. 10C is the next column from the last column of FIG. 10B.

The example of FIGS. 10A-10C is based on M equaling 16 (e.g., 16 sample values are read from pre-transform buffer 170 per clock cycle), and N equaling 2 (e.g., 2 computation units 176). As noted above, quarter of the computation units 176 may be needed for 8×8 sized blocks as compared to the 32×32 sized blocks. The variable naming in FIGS. 10A-10C is the same as that of FIGS. 9A-9C. As illustrated, three stages are needed to complete the computation for the intermediate values, whereas the C-implementation requires four stages. Also, in this example, I4 and I5 need not necessarily be used only for feedback.

The following is example of software instructions for performing the operations of a transform (e.g., inverse DCT) to generate 16 intermediate values for a 16×16 sized block. The instructions are arranged in 7 stages. However, with the rearranging of the operations, it may be possible for transform circuit 174 and transform circuit 186 to perform the operations in 4 stages using only half of the computation units 176 than the ones needed for 32×32 sized blocks.

C-language code for 16 × 16 transform

```
Int32 step1[16], step2[16];
Int32 temp1, temp2;
    // stage 1
    step1[0] = input[0/2];
    step1[1] = input[16/2];
    step1[2] = input[8/2];
    step1[3] = input[24/2];
    step1[4] = input[4/2];
    step1[5] = input[20/2];
    step1[6] = input[12/2];
    step1[7] = input[28/2];
    step1[8] = input[2/2];
    step1[9] = input[18/2];
    step1[10] = input[10/2];
    step1[11] = input[26/2];
    step1[12] = input[6/2];
    step1[13] = input[22/2];
    step1[14] = input[14/2];
    step1[15] = input[30/2];
    // stage 2
    step2[0] = step1[0];
    step2[1] = step1[1];
    step2[2] = step1[2];
    step2[3] = step1[3];
    step2[4] = step1[4];
    step2[5] = step1[5];
    step2[6] = step1[6];
    step2[7] = step1[7];
    temp1 = step1[8] * vp9_cospi[30] − step1[15] * vp9_cospi[2];
    temp2 = step1[8] * vp9_cospi[2] + step1[15] * vp9_cospi[30];
    step2[8] = vp9_dct_const_round_shift(temp1);
    step2[15] = vp9_dct_const_round_shift(temp2);
    temp1 = step1[9] * vp9_cospi[14] − step1[14] * vp9_cospi[18];
    temp2 = step1[9] * vp9_cospi[18] + step1[14] * vp9_cospi[14];
    step2[9] = vp9_dct_const_round_shift(temp1);
    step2[14] = vp9_dct_const_round_shift(temp2);
    temp1 = step1[10] * vp9_cospi[22] − step1[13] * vp9_cospi[10];
    temp2 = step1[10] * vp9_cospi[10] + step1[13] * vp9_cospi[22];
    step2[10] = vp9_dct_const_round_shift(temp1);
    step2[13] = vp9_dct_const_round_shift(temp2);
    temp1 = step1[11] * vp9_cospi[6] − step1[12] * vp9_cospi[26];
    temp2 = step1[11] * vp9_cospi[26] + step1[12] * vp9_cospi[6];
    step2[11] = vp9_dct_const_round_shift(temp1);
    step2[12] = vp9_dct_const_round_shift(temp2);
    // stage 3
    step1[0] = step2[0];
    step1[1] = step2[1];
    step1[2] = step2[2];
    step1[3] = step2[3];
    temp1 = step2[4] * vp9_cospi[28] − step2[7] * vp9_cospi[4];
    temp2 = step2[4] * vp9_cospi[4] + step2[7] * vp9_cospi[28];
    step1[4] = vp9_dct_const_round_shift(temp1);
    step1[7] = vp9_dct_const_round_shift(temp2);
    temp1 = step2[5] * vp9_cospi[12] − step2[6] * vp9_cospi[20];
    temp2 = step2[5] * vp9_cospi[20] + step2[6] * vp9_cospi[12];
    step1[5] = vp9_dct_const_round_shift(temp1);
    step1[6] = vp9_dct_const_round_shift(temp2);
    step1[8] = step2[8] + step2[9];
    step1[9] = step2[8] − step2[9];
    step1[10] = −step2[10] + step2[11];
    step1[11] = step2[10] + step2[11];
    step1[12] = step2[12] + step2[13];
    step1[13] = step2[12] − step2[13];
    step1[14] = −step2[14] + step2[15];
    step1[15] = step2[14] + step2[15];
    // stage 4
    temp1 = (step1[0] + step1[1]) * vp9_cospi[16];
    temp2 = (step1[0] − step1[1]) * vp9_cospi[16];
    step2[0] = vp9_dct_const_round_shift(temp1);
    step2[1] = vp9_dct_const_round_shift(temp2);
    temp1 = step1[2] * vp9_cospi[24] − step1[3] * vp9_cospi[8];
    temp2 = step1[2] * vp9_cospi[8] + step1[3] * vp9_cospi[24];
    step2[2] = vp9_dct_const_round_shift(temp1);
```

-continued

C-language code for 16 × 16 transform

```
    step2[3] = vp9_dct_const_round_shift(temp2);
    step2[4] = step1[4] + step1[5];
    step2[5] = step1[4] − step1[5];
    step2[6] = −step1[6] + step1[7];
    step2[7] = step1[6] + step1[7];
    step2[8] = step1[8];
    step2[15] = step1[15];
    temp1 = −step1[9] * vp9_cospi[8] + step1[14] * vp9_cospi[24];
    temp2 = step1[9] * vp9_cospi[24] + step1[14] * vp9_cospi[8];
    step2[9] = vp9_dct_const_round_shift(temp1);
    step2[14] = vp9_dct_const_round_shift(temp2);
    temp1 = −step1[10] * vp9_cospi[24] − step1[13] * vp9_cospi[8];
    temp2 = −step1[10] * vp9_cospi[8] + step1[13] * vp9_cospi[24];
    step2[10] = vp9_dct_const_round_shift(temp1);
    step2[13] = vp9_dct_const_round_shift(temp2);
    step2[11] = step1[11];
    step2[12] = step1[12];
    // stage 5
    step1[0] = step2[0] + step2[3];
    step1[1] = step2[1] + step2[2];
    step1[2] = step2[1] − step2[2];
    step1[3] = step2[0] − step2[3];
    step1[4] = step2[4];
    temp1 = (step2[6] − step2[5]) * vp9_cospi[16];
    temp2 = (step2[5] + step2[6]) * vp9_cospi[16];
    step1[5] = vp9_dct_const_round_shift(temp1);
    step1[6] = vp9_dct_const_round_shift(temp2);
    step1[7] = step2[7];
    step1[8] = step2[8] + step2[11];
    step1[9] = step2[9] + step2[10];
    step1[10] = step2[9] − step2[10];
    step1[11] = step2[8] − step2[11];
    step1[12] = −step2[12] + step2[15];
    step1[13] = −step2[13] + step2[14];
    step1[14] = step2[13] + step2[14];
    step1[15] = step2[12] + step2[15];
    // stage 6
    step2[0] = step1[0] + step1[7];
    step2[1] = step1[1] + step1[6];
    step2[2] = step1[2] + step1[5];
    step2[3] = step1[3] + step1[4];
    step2[4] = step1[3] − step1[4];
    step2[5] = step1[2] − step1[5];
    step2[6] = step1[1] − step1[6];
    step2[7] = step1[0] − step1[7];
    step2[8] = step1[8];
    step2[9] = step1[9];
    temp1 = (−step1[10] + step1[13]) * vp9_cospi[16];
    temp2 = (step1[10] + step1[13]) * vp9_cospi[16];
    step2[10] = vp9_dct_const_round_shift(temp1);
    step2[13] = vp9_dct_const_round_shift(temp2);
    temp1 = (−step1[11] + step1[12]) * vp9_cospi[16];
    temp2 = (step1[11] + step1[12]) * vp9_cospi[16];
    step2[11] = vp9_dct_const_round_shift(temp1);
    step2[12] = vp9_dct_const_round_shift(temp2);
    step2[14] = step1[14];
    step2[15] = step1[15];
    // final stage
    output[0] = step2[0] + step2[15];
    output[1] = step2[1] + step2[14];
    output[2] = step2[2] + step2[13];
    output[3] = step2[3] + step2[12];
    output[4] = step2[4] + step2[11];
    output[5] = step2[5] + step2[10];
    output[6] = step2[6] + step2[ 9];
    output[7] = step2[7] + step2[ 8];
    output[8] = step2[7] − step2[ 8];
    output[9] = step2[6] − step2[ 9];
    output[10] = step2[5] − step2[10];
    output[11] = step2[4] − step2[11];
    output[12] = step2[3] − step2[12];
    output[13] = step2[2] − step2[13];
    output[14] = step2[1] − step2[14];
    output[15] = step2[0] − step2[15];
```

FIGS. 11A-11C are tables illustrating example operations for generating 16 intermediate values for 16×16 sized block.

FIGS. 11A-11C should be read as continuation of the same table. For instance, the first column of FIG. 11B is the next column from the last column of FIG. 11A, and the first column of FIG. 11C is the next column from the last column of FIG. 11B.

The example of FIGS. 11A-11C is based on M equaling 16 (e.g., 16 sample values are read from pre-transform buffer 170 per clock cycle), and N equaling 4 (e.g., 4 computation units 176). As noted above, half the computation units 176 may be needed for 16×16 sized blocks as compared to the 32×32 sized blocks. The variable naming in FIGS. 11A-11C is the same as that of FIGS. 9A-9C and 10A-10C. As illustrated, four stages are needed to complete the computation for the intermediate values, whereas the C-implementation requires seven stages of operation. Also, in this example, I4 and I5 need not necessarily be used only for feedback.

The following is example of software instructions for performing the operations of a transform (e.g., inverse DCT) to generate 4 intermediate values for an 4×4 sized block. The instructions are arranged in 2 stages. However, with the rearranging of the operations, it may be possible for transform circuit 174 and transform circuit 186 to perform the operations in 1 stage using only a quarter of the computation units 176 than the ones needed for 32×32 sized blocks.

| C-language code for 4 × 4 transform |
| --- |
| Int32 step[4];<br>    Int32 temp1, temp2;<br>    // stage 1<br>    temp1 = (input[0] + input[2]) * vp9_cospi[16];<br>    temp2 = (input[0] − input[2]) * vp9_cospi[16];<br>    step[0] = vp9_dct_const_round_shift(temp1);<br>    step[1] = vp9_dct_const_round_shift(temp2);<br>    temp1 = input[1] * vp9_cospi[24] − input[3] * vp9_cospi[8];<br>    temp2 = input[1] * vp9_cospi[8] + input[3] * vp9_cospi[24];<br>    step[2] = vp9_dct_const_round_shift(temp1);<br>    step[3] = vp9_dct_const_round_shift(temp2);<br>    // final stage<br>    output[0] = step[0] + step [3];<br>    output[1] = step[1] + step [2];<br>    output[2] = step[1] − step [2];<br>    output[3] = step[0] − step [3]; |

FIGS. 12A-12C are tables illustrating example operations for generating 4 intermediate values for 4×4 sized block. FIGS. 12A-12C should be read as continuation of the same table. For instance, the first column of FIG. 12B is the next column from the last column of FIG. 12A, and the first column of FIG. 12C is the next column from the last column of FIG. 12B.

The example of FIGS. 12A-12C is based on M equaling 16 (e.g., 16 sample values are read from pre-transform buffer 170 per clock cycle), and N equaling 1 (e.g., 1 of computation units 176). As noted above, eighth of the computation units 176 may be needed for 4×4 sized blocks as compared to the 32×32 sized blocks. The variable naming in FIGS. 12A-12C is the same as that of FIGS. 9A-9C, 10A-10C, and 11A-11C. As illustrated, one stage is needed to complete the computation for the intermediate values, whereas the C-implementation requires two stages. Also, in this example, I4 and I5 need not be necessary.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the claims.

What is claimed is:

1. A method of transforming video data, the method comprising:
    receiving, with a transform circuit, M sample values of a block of the video data from a pre-transform buffer, wherein M represents a non-zero integer value, and wherein the sample values comprise a plurality of frequency domain sample values;
    processing the M sample values with N computation units of the transform circuit to generate intermediate values, wherein processing the M sample values to generate the intermediate values includes feeding back temporary values from output of one or more of the N computation units to input of one or more of the N computation units for transforming the same block of the video data that includes the M sample values, and wherein N represents a non-zero integer value;
    storing a first set of the intermediate values in a transpose buffer; and
    storing a second set of the intermediate values in the pre-transform buffer that are to be later retrieved for storage in the transpose buffer,
    wherein the transform circuit comprises a first transform circuit, the method further comprising processing, with a second transform circuit, the intermediate values generated by the first transform unit to generate final transform values, the final transform values comprising a plurality of residual sample values representing differences between a current video block and a predictive block, and
    wherein processing, with the second transform unit, the intermediate values comprises:
        receiving, with the second transform circuit, a plurality of the intermediate values from the transpose buffer; and
        processing the plurality of intermediate values with computation units of the second transform circuit to generate the final transform values, wherein processing the plurality of intermediate values to generate the final transform values includes feeding back temporary values from output of one or more of the computation units of the second transform circuit to input of one or more of the computation units of the second transform circuit.

2. The method of claim 1, wherein the block of the video data comprises an A×B block of sample values, wherein A and B each represent a respective non-zero integer value, and wherein M is less than A and B.

3. The method of claim 1, further comprising:
    outputting the first set of intermediate values from the transpose buffer to the second transform circuit;
    during the outputting of the first set of intermediate values, retrieving the second set of intermediate values from the pre-transform buffer, and storing the second set of intermediate values, retrieved from the pre-transform buffer, in the transpose buffer.

4. The method of claim 1, wherein storing the first set of intermediate values comprises:
    storing a first plurality of the first set of intermediate values in a first internal buffer of the transpose buffer; and
    storing a second plurality of the first set of intermediate values in a second internal buffer of the transpose buffer.

5. The method of claim 4, further comprising:
    outputting the first plurality of the first set of intermediate values from the first internal buffer to the second transform circuit;
    subsequent to outputting the first plurality of the first set of intermediate values, outputting the second plurality of the first set of intermediate values from the second internal buffer to the second transform circuit; and
    during the outputting of the second plurality of the first set of intermediate values, storing, in the first internal buffer of the transpose buffer, a plurality of the second set of the intermediate values from the pre-transform buffer.

6. The method of claim 5, further comprising:
    alternating outputting from one of the first internal buffer or the second internal buffer to the second transform circuit, and storing, from the pre-transform buffer, in the other one of the first internal buffer or the second internal buffer.

7. The method of claim 1, wherein storing the second set of the intermediate values in the pre-transform buffer that are to be later retrieved for storage in the transpose buffer comprises storing the second set of the intermediate values in memory locations of the pre-transform buffer from which the M sample values were retrieved.

8. The method of claim 1, further comprising:
    reconstructing the current video block based on the predictive block and the plurality of residual sample values.

9. A device for transforming video data, the device comprising:
a pre-transform buffer configured to store sample values of a block of the video data, wherein the sample values comprise a plurality of frequency domain sample values;
a transform circuit comprising N computation units, wherein the transform circuit is coupled to the pre-transform buffer and is configured to:
receive M sample values of the stored sample values of the block of the video data from the pre-transform buffer, wherein M represents a non-zero integer value;
process the M sample values with the N computation units of the transform circuit to generate intermediate values, wherein processing the M sample values to generate the intermediate values includes feeding back temporary values from output of one or more of the N computation units to input of one or more of the N computation units for transforming the same block of the video data that includes the M sample values, and wherein N represents a non-zero integer value; and
output a first set of the intermediate values for storage; and
a transpose buffer coupled to the pre-transform buffer and the transform circuit, wherein the transpose buffer is configured to receive the first set of intermediate values and store the first set of intermediate values,
wherein the pre-transform buffer is configured to store a second set of the intermediate values that are to be later retrieved for storage in the transpose buffer,
wherein the transform circuit comprises a first transform circuit, the device further comprising a second transform circuit, wherein the second transform circuit is configured to process the intermediate values generated by the first transform unit to generate final transform values, the final transform values comprising a plurality of residual sample values representing differences between a current video block and a predictive block,
wherein to process the intermediate values, the second transform circuit is configured to:
receive a plurality of the intermediate values from the transpose buffer; and
process the plurality of intermediate values with computation units of the second transform circuit to generate the final transform values, wherein processing the plurality of intermediate values to generate the final transform values includes feeding back temporary values from output of one or more of the computation units of the second transform circuit to input of one or more of the computation units of the second transform circuit.

10. The device of claim 9, wherein the block of the video data comprises an A×B block of sample values, wherein A and B each represent a respective non-zero integer value, and wherein M is less than A and B.

11. The device of claim 9, further comprising a controller circuit, the device further comprising a second transform circuit, wherein:
the controller circuit is configured to cause the transpose buffer to output the first set of intermediate values to the second transform circuit, and
during the outputting of the first set of intermediate values, the controller circuit is configured to retrieve, from the pre-transform buffer, the second set of intermediate values, and store the second set of intermediate values, retrieved from the pre-transform buffer, in the transpose buffer.

12. The device of claim 9, further comprising a controller circuit, wherein the transpose buffer comprises a first internal buffer and a second internal buffer, wherein the controller circuit is configured to cause the first internal buffer to store a first plurality of the first set of intermediate values, and cause the second internal buffer to store a second plurality of the first set of intermediate values.

13. The device of claim 12, wherein:
the controller circuit is configured to cause the first internal buffer to output the first plurality of the first set of intermediate values to the second transform circuit, and
subsequent to outputting the first plurality of the first set of intermediate values, the controller circuit is configured to cause the second internal buffer to output the second plurality of the first set of intermediate values to the second transform circuit, and
during the outputting of the second plurality of the first set of intermediate values, controller circuit is configured to cause the first internal buffer to store a plurality of the second set of the intermediate values from the pre-transform buffer.

14. The device of claim 13, wherein the controller circuit is configured to cause the first and second internal buffers to alternate outputting from one of the first internal buffer or the second internal buffer to the second transform circuit, and store, from the pre-transform buffer, in the other one of the first internal buffer or the second internal buffer.

15. The device of claim 9, wherein the pre-transform buffer is configured to store the second set of the intermediate values that are to be later retrieved for storage in the transpose buffer in memory locations of the pre-transform buffer from which the M sample values were retrieved.

16. The device of claim 9, wherein the device comprises one of:
a video decoder; or
a wireless communication device comprising the video decoder.

17. A device for transforming video data, the device comprising:
a pre-transform buffer;
a transpose buffer; and
a transform circuit comprising:
N computation units;
means for receiving M sample values of a block of the video data from the pre-transform buffer, wherein M represents a non-zero integer value, and wherein the sample values comprise a plurality of frequency domain sample values;
means for processing the M sample values with the N computation units of the transform circuit to generate intermediate values, wherein the means for processing the M sample values to generate the intermediate values includes means for feeding back temporary values from output of one or more of the N computation units to input of one or more of the N computation units for transforming the same block of the video data that includes the M sample values, and wherein N represents a non-zero integer value; and
means for storing a first set of the intermediate values in the transpose buffer;
wherein the pre-transform buffer is configured to store a second set of the intermediate values that are to be later retrieved for storage in the transpose buffer, wherein the transform circuit comprises a first transform circuit, the device further comprising a second transform circuit comprising means for processing the intermediate values generated by the first transform unit to generate final transform values, the final transform values comprising a plurality of residual sample values representing differences between a current video block and a predictive block, and wherein the means for processing the intermediate values comprises:
- means for receiving a plurality of the intermediate values from the transpose buffer; and
- means for processing the plurality of intermediate values with computation units of the second transform circuit to generate the final transform values, wherein the means for processing the plurality of intermediate values to generate the final transform values includes means for feeding back temporary values from output of one or more of the computation units of the second transform circuit to input of one or more of the computation units of the second transform circuit.

18. The device of claim 17, wherein the block of the video data comprises an A×B block of sample values, wherein A and B each represent a respective non-zero integer value, and wherein M is less than A and B.

19. The device of claim 17, the device further comprising:
- means for outputting the first set of intermediate values from the transpose buffer to the second transform circuit;
- means for retrieving the second set of intermediate values from the pre-transform buffer during the outputting of the first set of intermediate values; and
- means for storing the second set of intermediate values, retrieved from the pre-transform buffer, in the transpose buffer.

20. The device of claim 17, wherein the means for storing the first set of intermediate values comprises:
- means for storing a first plurality of the first set of intermediate values in a first internal buffer of the transpose buffer; and
- means for storing a second plurality of the first set of intermediate values in a second internal buffer of the transpose buffer.

21. The device of claim 20, the device further comprising:
- means for outputting the first plurality of the first set of intermediate values from the first internal buffer to the second transform circuit;
- means for outputting the second plurality of the first set of intermediate values from the second internal buffer to the second transform circuit subsequent to outputting the first plurality of the first set of intermediate values; and
- means for storing, in the first internal buffer of the transpose buffer, a plurality of the second set of the intermediate values from the pre-transform buffer during the outputting of the second plurality of the first set of intermediate values.

22. A computer-readable storage medium storing instruction that when executed cause a first transform circuit to:
- receive M sample values of a block of the video data from a pre-transform buffer, wherein M represents a non-zero integer value, and wherein the sample values comprise a plurality of frequency domain sample values;
- process the M sample values with N computation units of the first transform circuit to generate intermediate values, wherein the instructions that cause the first transform circuit to process the M sample values to generate the intermediate values include instructions that cause the first transform circuit to feed back temporary values from output of one or more of the N computation units to input of one or more of the N computation units for transforming the same block of the video data that includes the M sample values, and wherein N represents a non-zero integer value;
- store a first set of the intermediate values in a transpose buffer; and
- store a second set of the intermediate values in the pre-transform buffer that are to be later retrieved for storage in the transpose buffer, wherein the computer-readable storage medium further comprises instruction that when executed cause a second transform circuit to process the intermediate values generated by the first transform unit to generate final transform values, the final transform values comprising a plurality of residual sample values representing differences between a current video block and a predictive block, and wherein the instructions that causes the second transform circuit to process the intermediate values comprise instructions that cause the second transform circuit to:
- receive a plurality of the intermediate values from the transpose buffer; and
- process the plurality of intermediate values with computation units of the second transform circuit to generate the final transform values, wherein the instructions that cause the second transform circuit to process the plurality of intermediate values to generate the final transform values include instructions that cause the second transform circuit to feed back temporary values from output of one or more of the computation units of the second transform circuit to input of one or more of the computation units of the second transform circuit.

23. The computer-readable storage medium of claim 22, wherein the block of the video data comprises an A×B block of sample values, wherein A and B each represent a respective non-zero integer value, and wherein M is less than A and B.

24. The computer-readable storage medium of claim 22, wherein the instructions that cause the first transform circuit to store the first set of intermediate values comprise instructions that cause the first transform circuit to:
- store a first plurality of the first set of intermediate values in a first internal buffer of the transpose buffer; and
- store a second plurality of the first set of intermediate values in a second internal buffer of the transpose buffer.

25. The computer-readable storage medium of claim 22, wherein the instructions that cause the first transform circuit to store the second set of the intermediate values in the pre-transform buffer that are to be later retrieved for storage in the transpose buffer comprise instructions that cause the first transform circuit to store the second set of the intermediate values in memory locations of the pre-transform buffer from which the M sample values were retrieved.

* * * * *